United States Patent
Shimizu et al.

(10) Patent No.: US 10,394,413 B2
(45) Date of Patent: Aug. 27, 2019

(54) INFORMATION PROCESSING APPARATUS, INFORMATION PROCESSING METHOD, AND RECORDING MEDIUM

(71) Applicant: RICOH COMPANY, LTD., Tokyo (JP)

(72) Inventors: Yuko Shimizu, Tokyo (JP); Fumiko Tsuwano, Tokyo (JP); Hiroki Yamamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 19 days.

(21) Appl. No.: 15/647,407

(22) Filed: Jul. 12, 2017

(65) Prior Publication Data

US 2018/0024699 A1 Jan. 25, 2018

(30) Foreign Application Priority Data

Jul. 25, 2016 (JP) ................................. 2016-145452

(51) Int. Cl.
*G06F 3/048* (2013.01)
*G06F 3/0481* (2013.01)
*G06F 3/0484* (2013.01)
*G06F 3/0486* (2013.01)
*G06F 9/451* (2018.01)

(52) U.S. Cl.
CPC .......... *G06F 3/0481* (2013.01); *G06F 3/0486* (2013.01); *G06F 3/04845* (2013.01); *G06F 9/451* (2018.02)

(58) Field of Classification Search
CPC ...... G06F 3/048; G06F 3/0481; G06F 3/0486; G06F 3/0484; G06F 9/44; G06F 9/4443
See application file for complete search history.

(56) References Cited

U.S. PATENT DOCUMENTS

| | | | | |
|---|---|---|---|---|
| 5,917,483 A | * | 6/1999 | Duncan | ................. G06F 3/0481 715/788 |
| 2004/0113948 A1 | * | 6/2004 | Shahrbabaki | ......... G06F 3/0483 715/777 |
| 2017/0076478 A1 | | 3/2017 | Yamamoto et al. | |

FOREIGN PATENT DOCUMENTS

| JP | 2008-250915 | 10/2008 |
|---|---|---|
| JP | 2017-058720 | 3/2017 |

* cited by examiner

*Primary Examiner* — Xiomara L Bautista
(74) *Attorney, Agent, or Firm* — Oblon, McClelland, Maier & Neustadt, L.L.P.

(57) ABSTRACT

An apparatus and a method are provided, each of which: displays, on a display, a plurality of windows for a user to perform inputting for an application; receives selection of a first window to be set to an active state out of the plurality of displayed windows, the active state being capable of receiving user's operation; reads a function related to image editing, the function having been enabled in a second window of the plurality of displayed windows different than the first window, which has been in an active state immediately before receiving selection of the first window; and changes a display of the first window to an active state with the read function enabled in the first window.

9 Claims, 18 Drawing Sheets

TOOL MANAGEMENT INFORMATION

| TOOL ID | TOOL NAME | FUNCTION NAME | FUNCTION ID |
|---|---|---|---|
| 01 | EASY UI | FREE SHAPE DESIGNATION | a |
| | | OBJECT DESIGNATION | b |
| | | ENTIRE SCREEN DESIGNATION | c |
| | | OBJECT COLOR CHANGE | d |
| | | OBJECT BULK DELETION | e |
| 02 | HAND TOOL | | |

FIG. 3B

FUNCTION SETTING INFORMATION (31)

| SETTING ITEM | SETTABLE VALUE |
|---|---|
| COLOR OF DESIGNATED LINE | COLOR VALUE (RGB, CMYK, Lab) (EX. FLOAT VALUE) |
| OBJECT COLOR (SPOT COLOR) | COLOR VALUE (RGB, CMYK, Lab) (EX. FLOAT VALUE) |
| DENSITY OF SPOT COLOR | DENSITY (%) (EX. INT VALUE) |
| OVERPRINTING ON/OFF | ON/OFF (EX. BOOL VALUE) |
| MANUAL/AUTOMATIC | INDEX (EX. INT VALUE) |
| AUTOMATIC SETTING | INDEX (EX. INT VALUE) |
|  | INDEX (EX. INT VALUE) |
| OBJECT COLOR (SPOT COLOR) | COLOR VALUE (RGB, CMYK, Lab) (EX. FLOAT VALUE) |
| DENSITY OF SPOT COLOR | DENSITY (%) (EX. INT VALUE) |
| OVERPRINTING ON/OFF | ON/OFF (EX. BOOL VALUE) |
| MANUAL/AUTOMATIC | INDEX (EX. INT VALUE) |
| OBJECT COLOR (SPOT COLOR) | COLOR VALUE (RGB, CMYK, Lab) (EX. FLOAT VALUE) |
| DENSITY OF SPOT COLOR | DENSITY (%) (EX. INT VALUE) |
| OVERPRINTING ON/OFF | ON/OFF (EX. BOOL VALUE) |
| OBJECT COLOR (SPOT COLOR) | COLOR VALUE (RGB, CMYK, Lab) (EX. FLOAT VALUE) |
| DENSITY OF SPOT COLOR | DENSITY (%) (EX. INT VALUE) |
| OVERPRINTING ON/OFF | ON/OFF (EX. BOOL VALUE) |
|  |  |
|  |  |

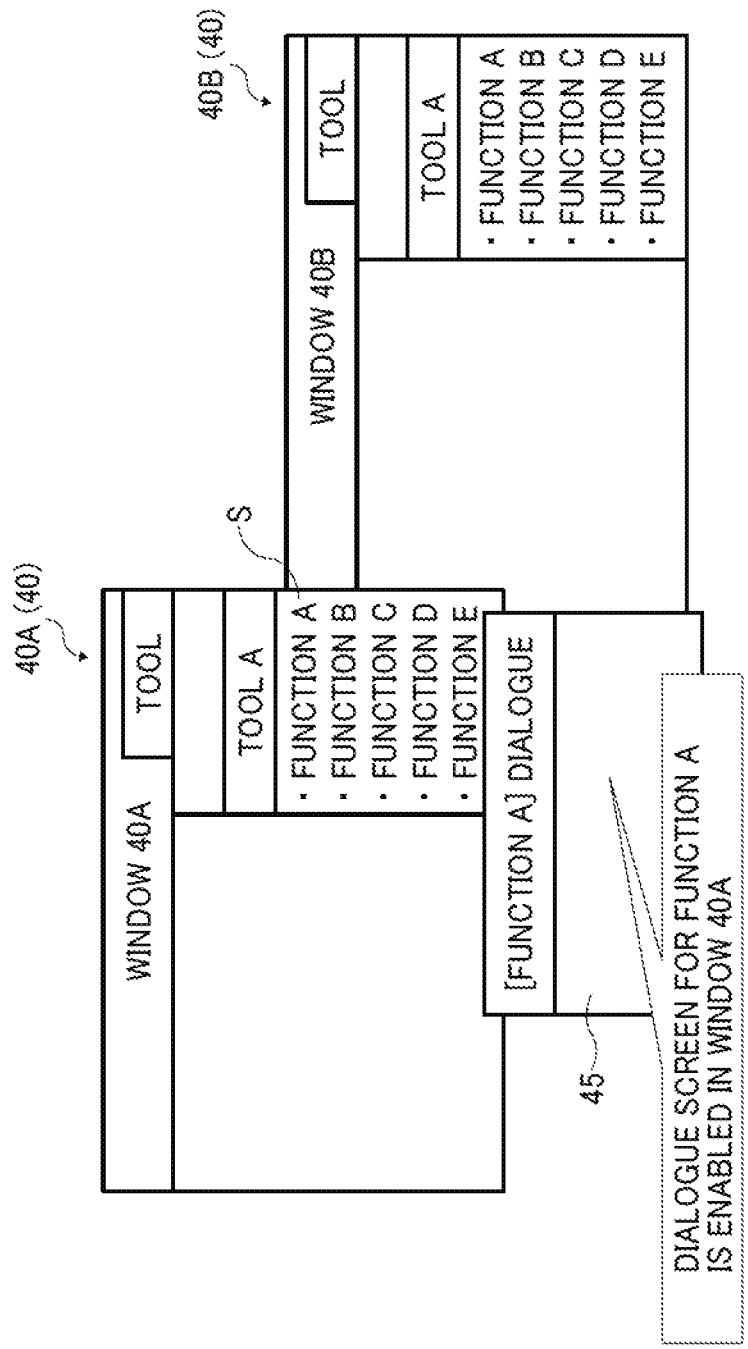

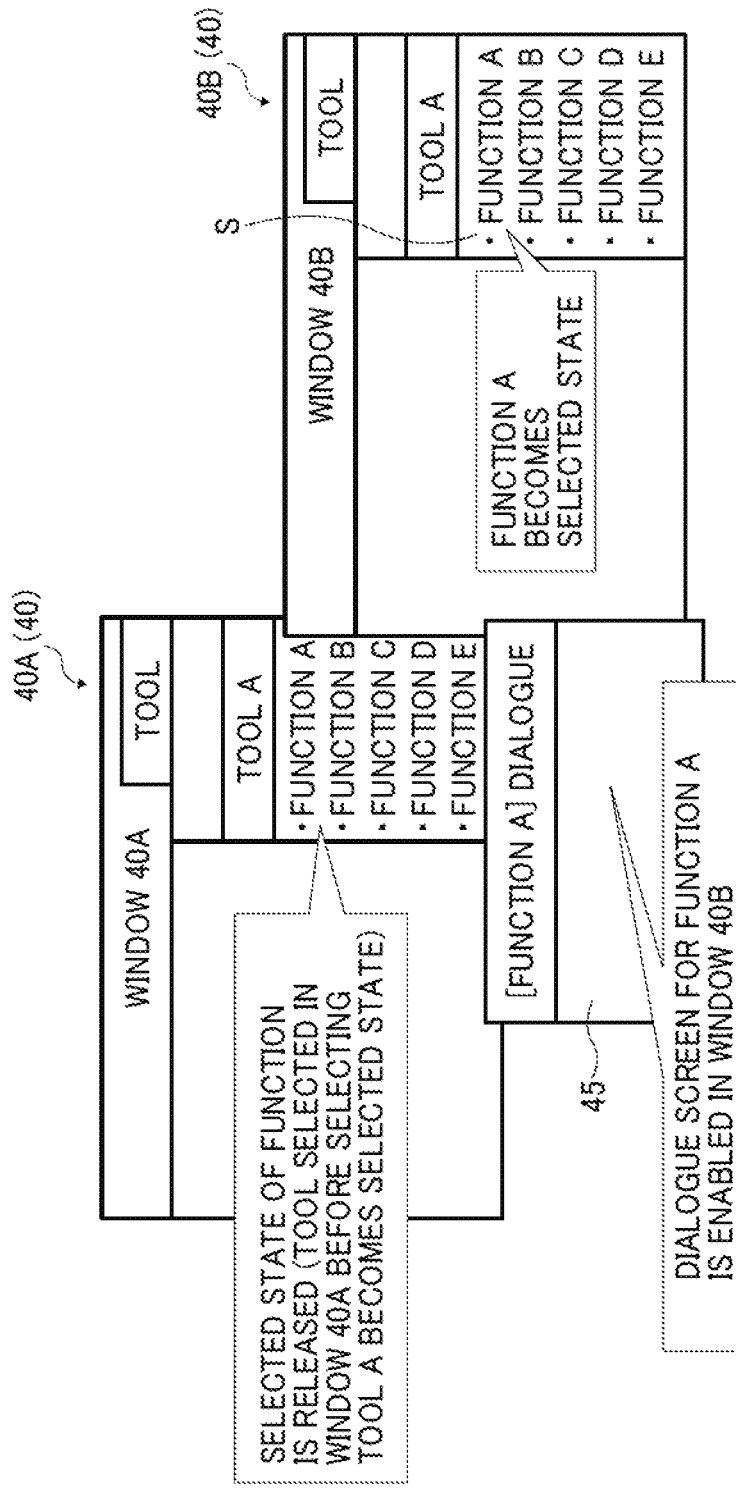

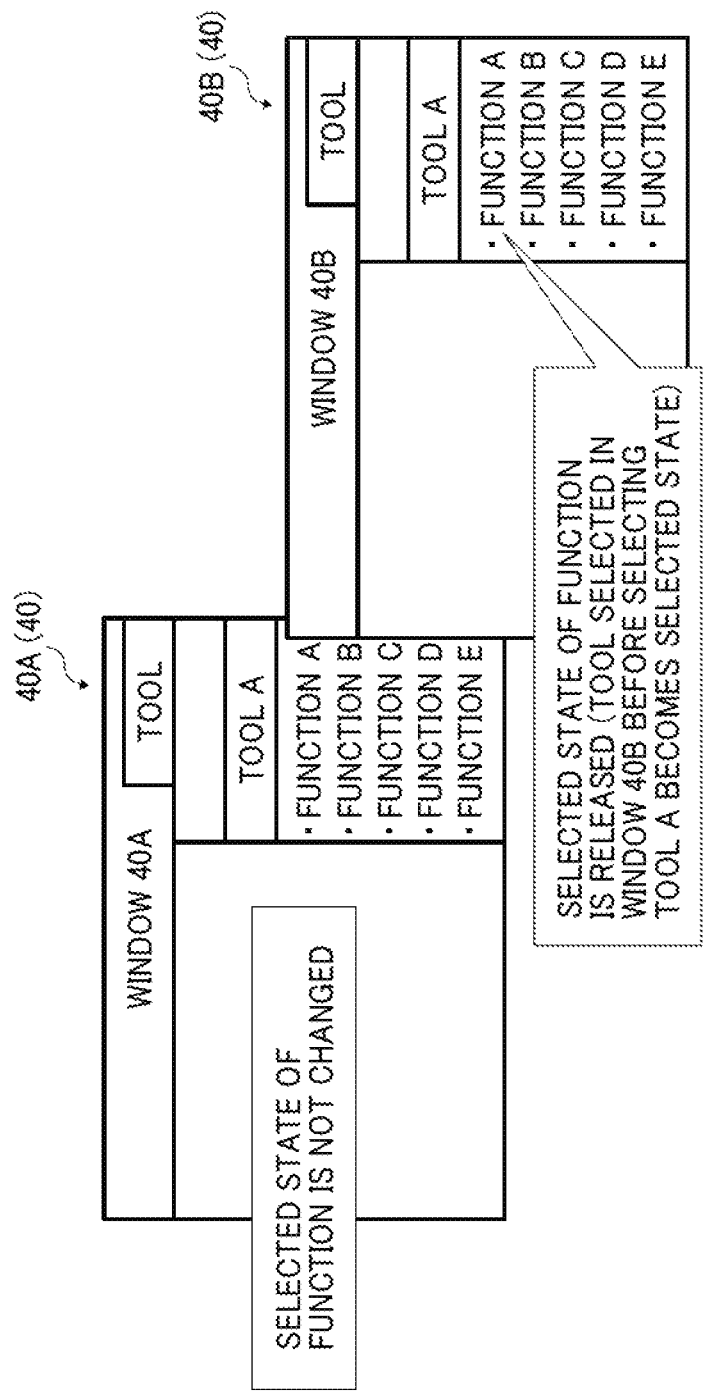

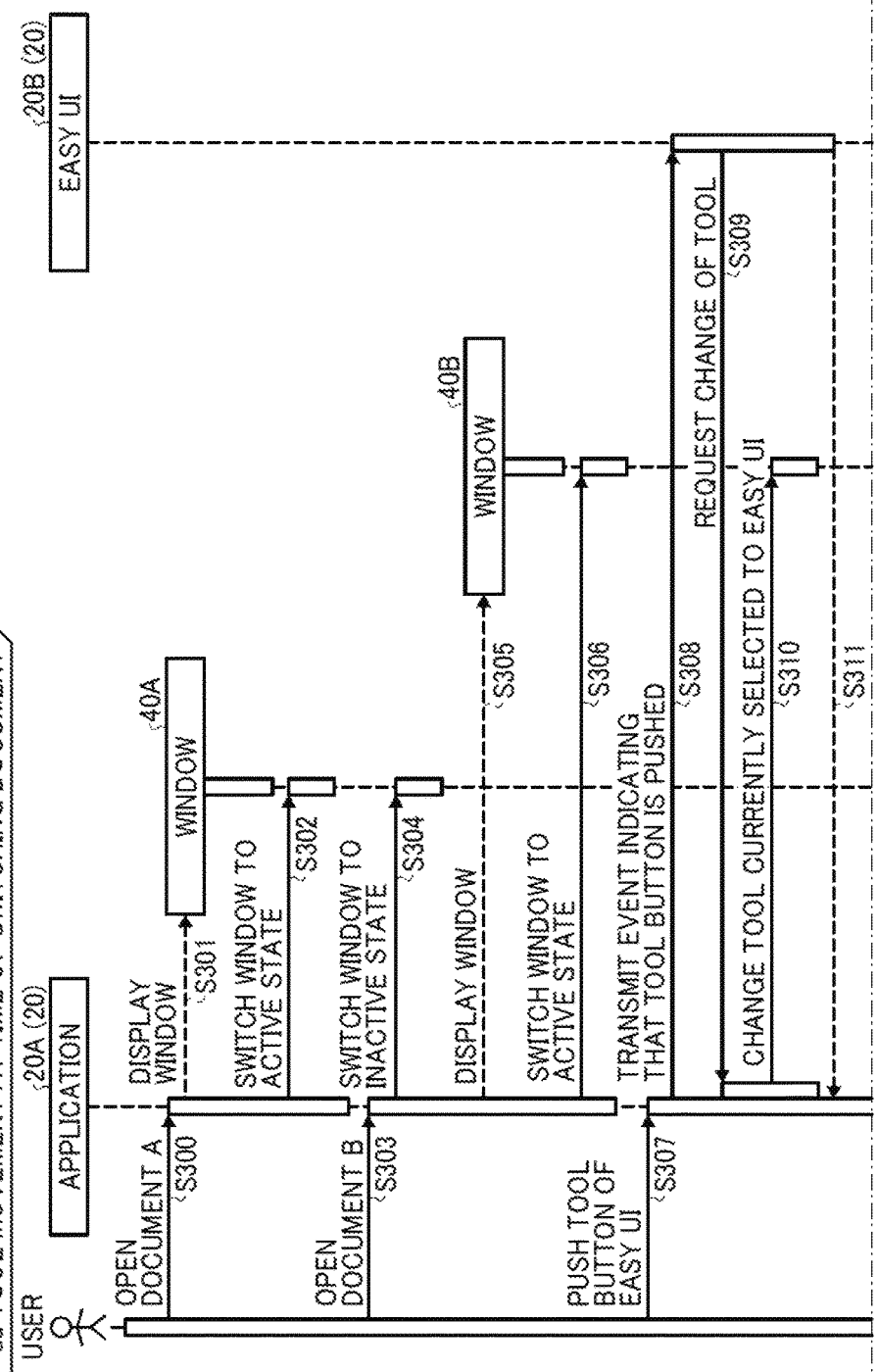

INFORMATION PROCESSING APPARATUS, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2016-145452, filed on Jul. 25, 2016, in the Japan Patent Office, the entire disclosure of which is hereby incorporated by reference herein.

BACKGROUND

Technical Field

The present invention relates to an information processing apparatus, an information processing method, and a recording medium.

Description of the Related Art

There is a known technology of creating an object and editing a color and a shape of an object by using an application for image editing. For example, an image may be edited using an editing tool which provides various kinds of functions for image editing. A user selects a function by operating a tool bar displayed on a window, and provides an operation command for creating, editing, or the like of an object. Editing processing is applied to the object in accordance with the operation command on the application side.

The user may also separate a desired area such as a tool bar from a window displayed by an application to rearrange the separated area on a screen.

Here, there may be a case of displaying a plurality of windows and performing input for image editing by using each of the windows. However, in the related art, a function that has been enabled in one window may not be succeeded to other windows. Therefore, every time selecting a desired window, the user may need to repeat selection of a function to be used for image editing all over again. In other words, work efficiency may be degraded during image editing in the related art.

SUMMARY

Example embodiments of the present invention include an apparatus and a method each of which: displays, on a display, a plurality of windows for a user to perform inputting for an application; receives selection of a first window to be set to an active state out of the plurality of displayed windows, the active state being capable of receiving user's operation; reads a function related to image editing, the function having been enabled in a second window of the plurality of displayed windows different than the first window, which has been in an active state immediately before receiving selection of the first window; and changes a display of the first window to an active state with the read function enabled in the first window.

Example embodiments of the present invention include a recording medium storing a program for performing the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 3A and 3B (FIG. 3) are a schematic diagram illustrating an exemplary data structure of tool management information;

FIGS. 7A to 7C (FIG. 7) are explanatory diagrams illustrating exemplary display transition of windows;

FIGS. 9A to 9C (FIG. 9) are a sequence diagram illustrating an exemplary image processing.

Figure 1:
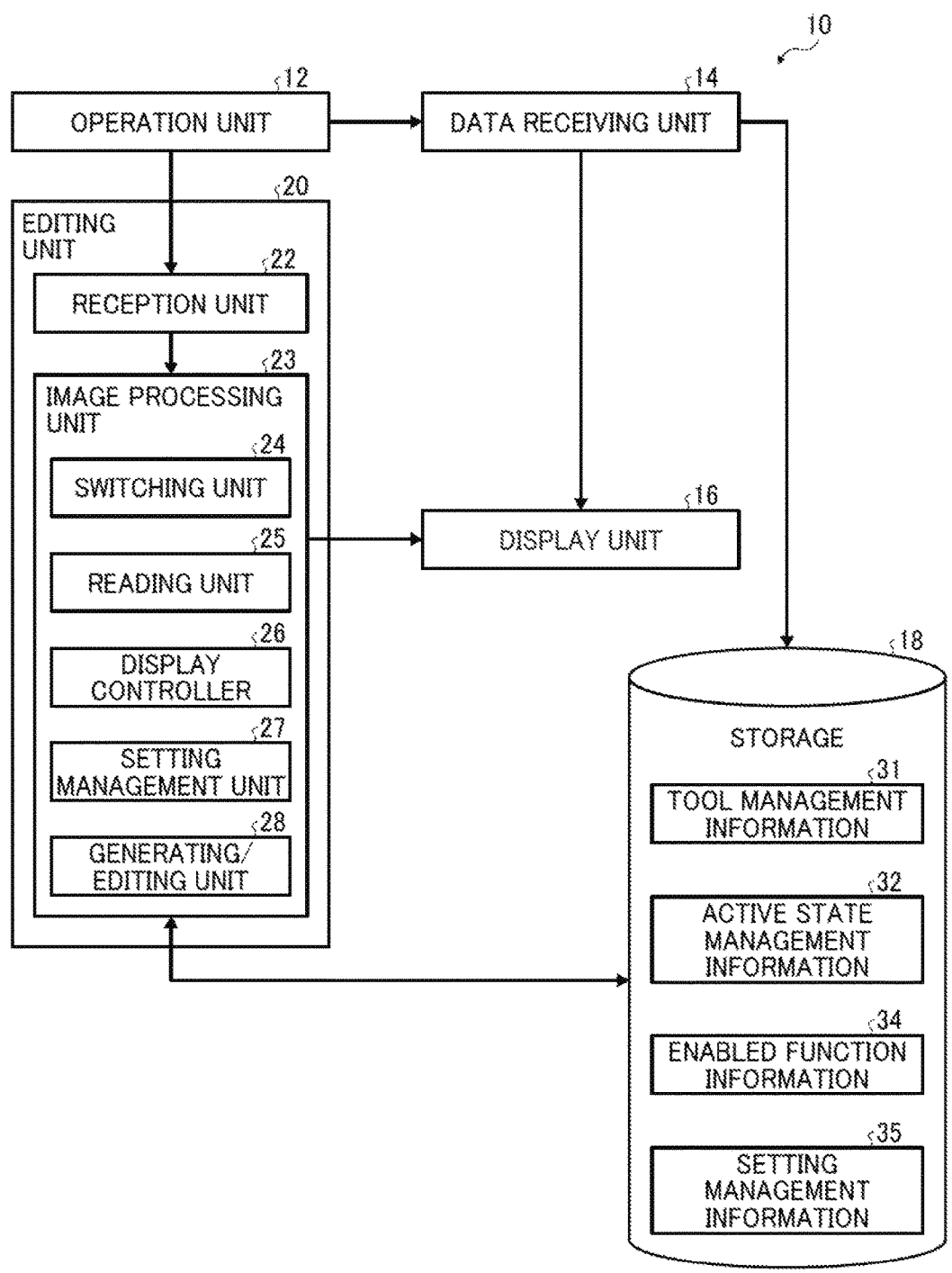
FIG. 1 is a block diagram illustrating an exemplary functional configuration of an information processing apparatus.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the following, an information processing apparatus, an information processing method, and a recording medium storing an information processing program according to embodiments will be described with reference to the attached drawings.

FIG. 1 is a block diagram illustrating an exemplary functional configuration of an information processing apparatus 10. The information processing apparatus 10 is a device to perform image editing.

The information processing apparatus 10 includes an operation unit 12, a data receiving unit 14, a display unit 16, a storage 18, and an editing unit 20.

The operation unit 12 is an input device to be operated by a user. The operation unit 12 includes, for example, a keyboard, a mouse, and the like. In the following, a description will be provided by exemplifying a case where the operation unit 12 includes a mouse.

The data receiving unit 14 reads, from any desired memory, electronic data (such as document data, referred to as "document") designated in accordance with operation at the operation unit 12, and stores the read document in the storage 18. Additionally, the data receiving unit 14 controls display of an image of the read document on the display unit 16.

In the present embodiment, the description will be provided assuming that electronic data (document) has a data format of a portable document format (PDF). Note that the data format of the electronic data (document) is not limited to the PDF.

The display unit 16 is a device to display various kinds of images. The display unit 16 includes, for example, a liquid crystal display device and the like.

The information processing apparatus 10 has an application preliminarily installed to perform image editing. The application includes, for example, Illustrator, Acrobat, and the like sold by Adobe Systems Incorporated, but not limited thereto. In the present embodiment, the description will be provided by exemplifying a case of using the Acrobat as the application.

The data receiving unit 14 displays, on the display unit 16, a window to be displayed by executing the application. The window is an input screen for a user to perform inputting in a started application (Acrobat in the present embodiment). The user can perform image editing such as creation of an object and editing of an object for a document displayed on the window by inputting an operation command via the window.

In the present embodiment, the application displays each of a plurality of documents by a separate window. In other words, in the present embodiment, the information processing apparatus 10 starts a plurality of pieces of the application (Acrobat), thereby displaying a plurality of corresponding windows. Using each of the windows, the user provides, for each document, an operation command for image editing using a function related to image editing.

The application has a tool preliminarily introduced in order to provide one or more functions related to image editing. The tool is a program to provide a function related to image editing. In other words, the tool is a plug-in to provide one or more functions related to image editing. The tool actuates inside the application. In the present embodiment, the description will be provided for a case where the tool provides a plurality of functions related to image editing.

The functions related to image editing includes, for example, object editing functions (editing functions for a color, a density, a shape, arrangement, a pattern, a line type, and the like), a new object creating function, and the like (details will be described later). A function includes one or more setting items. A setting item is an item that can be set by using a corresponding function. A setting item that can be set is determined in accordance with a kind of tool adapted to provide a corresponding function.

A user selects a function in a desired tool via a window and inputs a desired setting value for a desired setting item in the selected function. A setting item includes one or more items that can be set and provided by a corresponding function. A setting value includes a value set for a corresponding setting item. A setting value may include, for example, a color value, a density value, and the like. With this configuration, the user performs operation related to image editing via the window.

Figure 2:
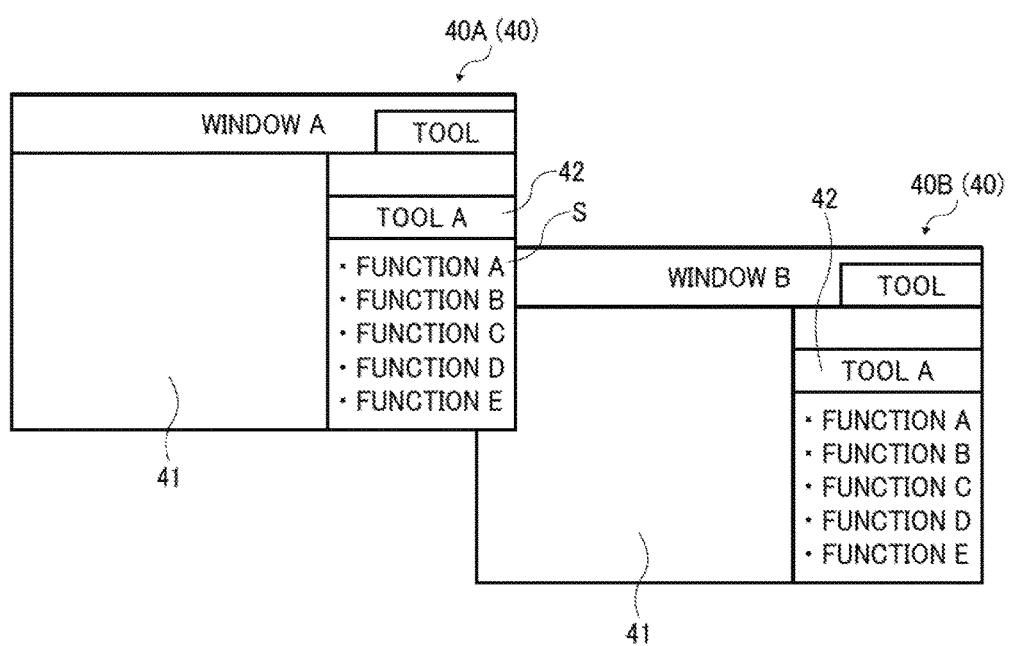
FIG. 2 is a schematic view illustrating examples of a window.

FIG. 2 is a schematic view illustrating examples of a window 40. FIG. 2 illustrates a state in which a plurality of windows 40 (window 40A and window 40B) is displayed.

A user selects one window out of the plurality of windows 40 by operating the operation unit 12. Consequently, the one out of the plurality of windows 40 currently displayed (i.e., a plurality of started applications) is arranged in a frontmost position among the plurality of windows 40 and becomes an active state capable of receiving user's operation. In the examples illustrated in FIG. 2, the window 40A is in the active state out of the window 40A and the window 40B. On the other hand, the window 40B is in an inactive state not capable of receiving user's operation.

Note that only one window 40 can become the active state among the plurality of windows 40 currently displayed. In other words, every time a new window 40 is selected, a window 40 that has been in the active state until then becomes the inactive state and the selected new window 40 becomes the active state.

The window 40 includes a drawing area 41. The drawing area 41 is an area operated by a user during image editing. A document edited/created in accordance with operation at the operation unit 12 by the user is displayed in the drawing area 41.

A tool bar 42 is displayed in a periphery of the drawing area 41 in the window 40. The tool bar 42 is a tool bar to call each of functions provided by the tool. A list of functions related to image editing incorporated in the plug-in is displayed in the tool bar 42. In the examples illustrated in FIG. 2, a plurality of functions including functions A to E is displayed in the tool bar 42.

The user selects one of the functions displayed in the tool bar 42 of a window 40 that is in the active state (window 40A in FIG. 2) and further selects a setting value of a setting item corresponding to the function by operating the operation unit 12. Then, the user operates the drawing area 41 by operating the operation unit 12.

Consequently the selected function is enabled and called with a setting value of the selected setting item. The user can perform operation that indicates image editing using the function and the setting value of the setting item. For example, the user performs operation related to creation of a new object and designation or change of a color, a shape, arrangement, a pattern, a line type, or the like of an object displayed in the drawing area 41 by using the selected function (i.e., enabled function).

Note that two or more kinds of tools (i.e., plug-ins) may be added to the application.

The application may have one kind of tool (plug-in) pre-installed or may have plural kinds of tools pre-installed. In the case where the plural kinds of tools are pre-installed, a tool bar 42 corresponding to each of the plural kinds of tools is displayed in the window 40. The user is only to select a desired tool bar 42 and then select one of functions in the selected tool bar 42 by operating the operation unit 12 to perform operation related to image editing. Additionally, a new tool may also be suitably installed in accordance with operation at the operation unit 12 by the user.

Referring back to FIG. 1, the description will be continued. The storage 18 is a device to record various kinds of data. The storage 18 is a recording medium such as a hard disk drive (HDD) or a flash memory. In the present embodiment, the storage 18 stores tool management information 31, active state management information 32, enabled function information 34, and setting management information 35, and the like.

FIG. 3 is a schematic diagram illustrating an exemplary data structure of the tool management information 31. The tool management information 31 is information to manage function setting information for each of functions per tool to provide the functions. The tool management information 31 correlates a tool identification data (ID), a tool name, and function setting information.

Every time each tool (plug-in) is installed in an application (e.g., Acrobat), the information processing apparatus 10 registers, in the tool management information 31, function setting information of functions provided by the installed tool. Note that each tool (plug-in) may hold, inside own tool (plug-in), function setting information of functions provided by each tool.

The tool ID is identifying information of a tool that is a plug-in already installed in the application. The tool name is a name of a tool identified by the corresponding tool ID. FIG. 3 illustrates, for example, two kinds of tools ("easy user interface (UI)" and "hand tool"). Note that the description will be provided for a case where the "hand tool" is a tool preliminarily provided in the application.

The function setting information is function setting information for functions provided by a tool identified by a corresponding tool ID. The function setting information includes a function name, a function ID, a setting item, and a settable value. The function name is a name of function. The function ID is identifying information of a function. The setting item is a setting item provided by a function identified by a corresponding function ID. The settable value is a value that can be set in a corresponding setting item in a function identified by a corresponding function ID.

For example, the data receiving unit 14 displays a window 40 including a tool bar 42 indicating a list of corresponding function names in function setting information as a list of functions provided by each of tools (plug-ins) already installed in the application. The user provides an operation command for a desired function name by operating the operation unit 12, thereby selecting a function of the function name. Additionally, the user inputs, by operating the operation unit 12, a value (referred to as a setting value) within a range of a settable value for one of the setting items corresponding to the selected function.

Figure 4A:
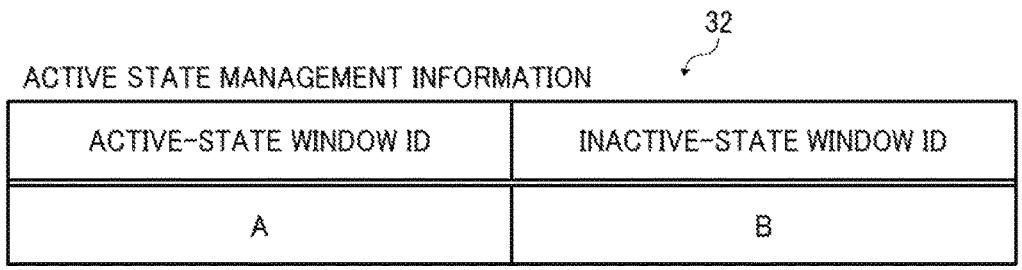
FIGS. 4A to 4C (FIG. 4) are schematic diagrams illustrating exemplary data structures of active state management information, enabled function information, and setting management information.
Figure 4B:
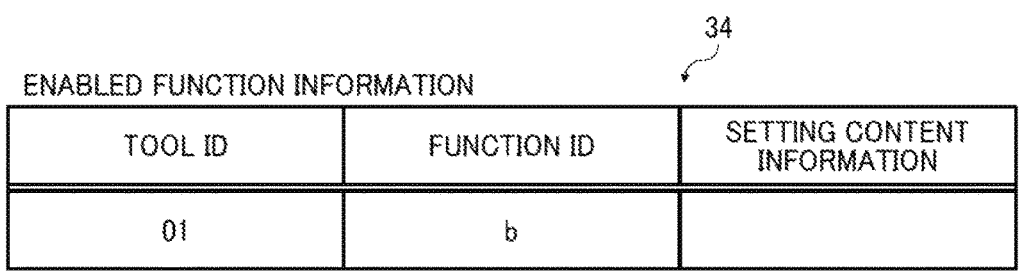
Figure 4C:
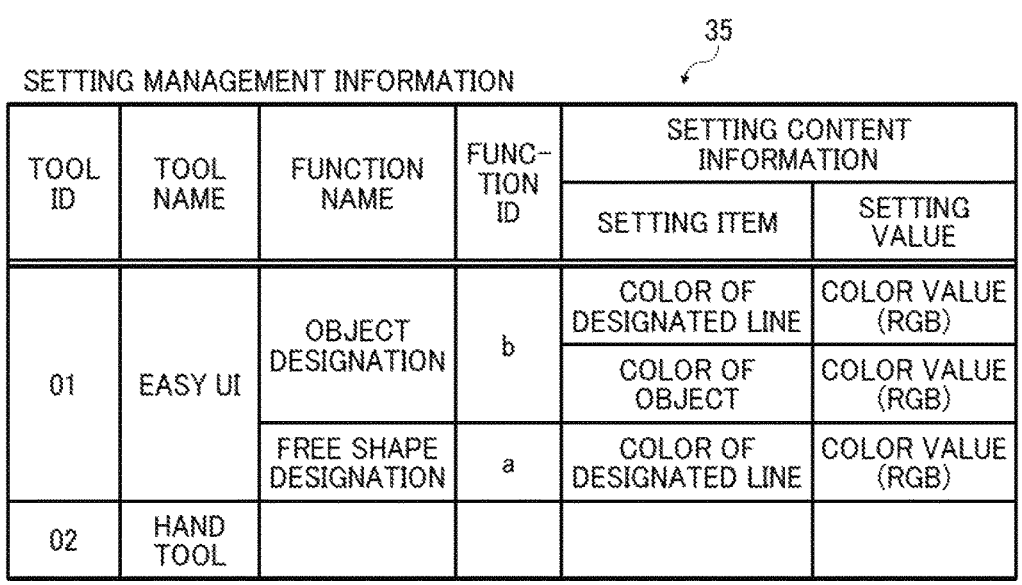

FIGS. 4A to 4C are schematic diagrams illustrating exemplary data structures of the active state management information 32, enabled function information 34, and setting management information 35.

FIG. 4A is the schematic diagram illustrating an exemplary data structure of the active state management information 32. The active state management information 32 is information to manage a window 40 in the active state. The active state management information 32 is updated by an image processing unit 23 described later.

In the example illustrated in FIG. 4A, the active state management information 32 stores a window ID of a window 40 in the active state and a window ID of a window 40 in the inactive state.

The active state indicates the state capable of receiving user's operation as described above. The inactive state indicates the state not capable of receiving user's operation (operation related to image editing) (however, receiving selection of a window 40 by a user). In the present embodiment, one out of a plurality of windows 40 currently displayed is set in the active state and a different window 40 is set in the inactive state.

The window ID is identifying information of a window 40. Here, in the present embodiment, the application displays each of a plurality of documents in a separate window as described above. Therefore, identifying information (document ID) of a document displayed in the window 40 may be used for a window ID. Note that only one ID is registered in an active-state window ID field in the active state management information 32 and a plurality of IDs is not registered in this field.

FIG. 4B is a diagram illustrating an exemplary data structure of the enabled function information 34. The enabled function information 34 is obtained by registering a tool ID of a tool, a function ID of a function, and setting content information for the function (described later in detail) which are currently enabled. In other words, the enabled function information 34 is obtained by registering a tool ID of a tool, a function ID of a function, and setting content information which are currently selected by the user. The enabled function information 34 is suitably updated by the image processing unit 23 described later.

FIG. 4C is a diagram illustrating an exemplary data structure of the setting management information 35. The setting management information 35 is information to manage setting content set by the user via each window 40.

The setting management information 35 mutually correlates a tool ID, a tool name, a function name, a function ID, and setting content information. The setting content information includes a setting item and a setting value. The setting content information indicates a setting value corresponding to each setting item set by the user by using a function identified by a corresponding function ID. Every time operation by the user is received, the setting management information 35 is suitably updated by the image processing unit 23 described later. Therefore, latest setting content information set by using a tool identified by a corresponding tool ID is registered in the setting content information.

Referring back to FIG. 1, the description will be continued. The editing unit 20 performs editing processing for an image in accordance with operation at the operation unit 12 by the user. For example, a central processing unit (CPU) implements each of functional units of the editing unit 20 by reading and executing, on a random access memory (RAM), the above-described application (including plug-in) stored in a read-only memory (ROM) and the like.

The editing unit 20 includes a reception unit 22 and the image processing unit 23.

The reception unit 22 receives an operation command at the operation unit 12 by a user.

In the present embodiment, the reception unit 22 receives selection of one window 40 to be set to an active state capable of receiving user's operation among the plurality of windows 40 currently displayed on the display unit 16. Consequently, the reception unit 22 receives a command to switch, to the active state, one of the windows 40 set in an inactive state among the plurality of windows 40 currently displayed. Consequently, the reception unit 22 also receives a command to switch, to the inactive state, the window 40 that has been in the active state until receiving the selection.

Furthermore, the reception unit 22 receives selection of a tool to be enabled and a function to be enabled via the window 40 in the active state. Additionally, the reception unit 22 receives setting content information for the enabled function (or being enabled). Furthermore, the reception unit 22 receives operational content operated by using the function. The operational content indicates content operated by the user. The operational content indicates, for example, an object shape designated by moving a mouse cursor pointing at a current position in the window 40 of a mouse used as the operation unit 12.

The reception unit 22 converts various kinds of received operation commands to event information which can be utilized in the image processing unit 23, and notifies the image processing unit 23. Consequently, the image processing unit 23 analyzes the event information, thereby receiving selection of a window 40 to be set to the active state, receiving selection of a tool to be enabled and a function to be enabled, and acquiring setting content information for the enabled function (or being enabled) and operational content.

The image processing unit 23 performs various kinds of processing such as image editing in accordance with the event information acquired from the reception unit 22.

The image processing unit 23 includes a switching unit 24, a reading unit 25, a display controller 26, a setting management unit 27, and a generating/editing unit 28.

The switching unit 24 switches, from the inactive state to the active state, one of the plurality of windows 40 currently displayed. The window 40 currently displayed is, namely, a window 40 corresponding to a started application. In other words, the window 40 currently displayed is a window 40 for a document already started.

Additionally, the switching unit 24 switches, from the active state to the inactive state, a window 40 that has been in the active state. As described above, the active state is the state capable of receiving user's operation. The inactive state is the state not capable of receiving user's operation.

When selection of one window out of the plurality of windows 40 currently displayed is received, the switching unit 24 switches the window 40 which has been in the active state to the inactive state. Then, the switching unit 24 deletes a window ID of the window 40 switched to the inactive state from the active-state window ID field of the active state management information 32, and moves the window ID to the inactive-state window ID field (refer to FIG. 4A).

Additionally, the switching unit 24 switches, from the inactive state to the active state, the window 40 having received the selection. Particularly, the switching unit 24 deletes a window ID of the window 40 having received selection from the inactive-state window ID field of the active state management information 32, and moves the window ID to the active-state window ID field (refer to FIG. 4A).

The setting management unit 27 manages the enabled function information 34 and the setting management information 35. The setting management unit 27 updates the setting management information 35 every time obtaining, from the operation unit 12, selection of a tool to be enabled and a function to be enabled, setting content information for the enabled function (or being enabled), and operational content (refer to FIG. 4C) via the reception unit 22.

Particularly, having received the setting content information, the setting management unit 27 registers, in the setting management information 35, the received setting content information in a manner correlated to a function ID of a function of the operational content and a tool ID of a tool to provide the function. Incidentally, in the case where setting values corresponding to the same tool ID, function ID, and setting item are already registered in the setting management information 35, the setting management unit 27 may overwrite the setting management information 35 with newly received setting content information and registers the same in a correlated manner.

Therefore, every time the reception unit 22 receives the new setting content information in accordance with operation at the operation unit 12 by the user, latest information including the tool and the function enabled by being selected by the user and the setting content information corresponding to the selected function is registered in the setting management information 35.

Additionally, every time receiving the tool to be enabled and the function to be enabled via the reception unit 22 from the operation unit 12, the setting management unit 27 overwrites the enabled function information 34 with a tool ID of the tool and a function ID of the function and registers the same (refer to FIG. 4B). Furthermore, the setting management unit 27 reads setting content information corresponding to the function ID (i.e., latest setting content information) from the setting management information 35 and registers the setting content information in a manner correlated to the enabled function information 34. Therefore, the tool ID of the tool currently selected, the function ID of the function in the tool currently selected, and the setting content information currently set are registered in the enabled function information 34.

The generating/editing unit 28 performs object generation and editing based on operational content received from the operation unit 12 via the reception unit 22. Specifically, the generating/editing unit 28 performs image editing such as object generation/editing by using a function and setting content information currently selected (currently enabled) and operational content operated by using the function. An image of a document including an object subjected to image editing is displayed by the display controller 26 in the drawing area 41 of a corresponding window 40 currently in the active state.

When the reception unit 22 receives selection of one window 40 to be set to the active state, the reading unit 25 reads a function related to image editing enabled in a different window 40 which has been in the active state capable of receiving user's operation immediately before receiving the selection.

Incidentally, the different window 40 which has been in the active state immediately before receiving the selection indicates one window 40 which has been in the active state during a period from receipt of the selection to switch of the selected window 40 from the inactive state to the active state.

In other words, the reading unit 25 reads a function enabled by being selected by a user in the window 40 which has been in the active state until receiving the selection.

Incidentally, the reading unit 25 may also read a function which has been enabled and a tool ID of a tool to provide the function in a different window 40 which has been in the active state immediately before receiving selection of one window 40 to be set to the active state. In this case, a function enabled in a tool of one window 40 can be succeeded by a same kind of tool in a different window 40 such that the tool is enabled. Note that a function that has been enabled in a tool of one window 40 may also be enabled in a different kind of tool in the different window 40. In this case, succession is carried out by enabling a similar function in the different kind of tool in the different window 40 corresponding to the function enabled in the tool of the one window 40.

Furthermore, the reading unit 25 may also read a function and setting content information for the function enabled in a different window 40 that has been in the active state immediately before receiving selection of one window 40 to be set to the active state. In the present embodiment, the description will be provided for a case where the reading unit 25 reads the function and the setting content information.

As described above, in the present embodiment, a tool ID of a tool selected immediately before, a function ID of a function in the tool selected immediately before, and setting content information set immediately before are registered in the enabled function information 34 by the setting management unit 27. Therefore, the reading unit 25 reads the function and the setting content information enabled in a different window 40 that has been in the active state immediately before by reading the function of the function ID and the setting content information from the enabled function information 34.

The display controller 26 displays, as the active state, a window 40 having received the selection to be set to the active state on the display unit 16 while enabling the function read by the reading unit 25. For example, the display controller 26 arranges the window 40 having received selection in a frontmost position among a plurality of windows 40 currently displayed. Then the display controller 26 sets the window 40 in a state capable of receiving user's operation.

Additionally, the display controller 26 displays a display field of the window 40 for the function read by the reading unit 25 as a selected state. The function is read from a function list indicated in a tool bar 42 corresponding to a tool to provide the function read by the reading unit 25. For example, the display controller 26 displays, in the tool bar 42, a color of the display field for the function using a color different from a color used in display fields for other functions. Consequently, the display controller 26 displays the window 40 in a state that the function is enabled.

A description will be provided using FIG. 2. For example, assume that the window 40A is switched to the active state from the inactive state and the window 40B is switched to the inactive state from the active state. Then, assume that a tool and a function selected in the window 40B which has been in the active state immediately before are a tool A and a function A.

In this case, the display controller 26 arranges the window 40A more front than the window 40B by processing by the editing unit 20, and further displays the window 40A in which the function A is set in a selected state in the function list displayed in the tool bar 42 of the tool A.

Additionally, the display controller 26 displays the window 40A having received the selection on the display unit 16 as the active state. In the window 40A, the function read by the reading unit 25 is currently selected and setting content information read by the reading unit 25 is set for the function.

Therefore, in the information processing apparatus 10 of the present embodiment, in the case where a user provides an operation command to switch a window 40 to the active state, a function enabled in a window 40 that has been in the active state is succeeded as the enabled state also in the window 40 newly set to the active state. Additionally, setting content information set for a function enabled in the window 40 that has been in the active state before being switched to the inactive state is reflected on the window 40 newly switched to the active state.

Therefore, in the information processing apparatus 10 of the present embodiment, work efficiency can be improved at the time of performing image editing while displaying the plurality of windows 40.

Additionally, as described above, in the information processing apparatus 10 of the present embodiment, a function enabled in a tool of a window 40 that has been in the active state immediately before may be succeeded by a same kind of tool in window 40 newly set to the active state so as to be enabled.

Figure 5:
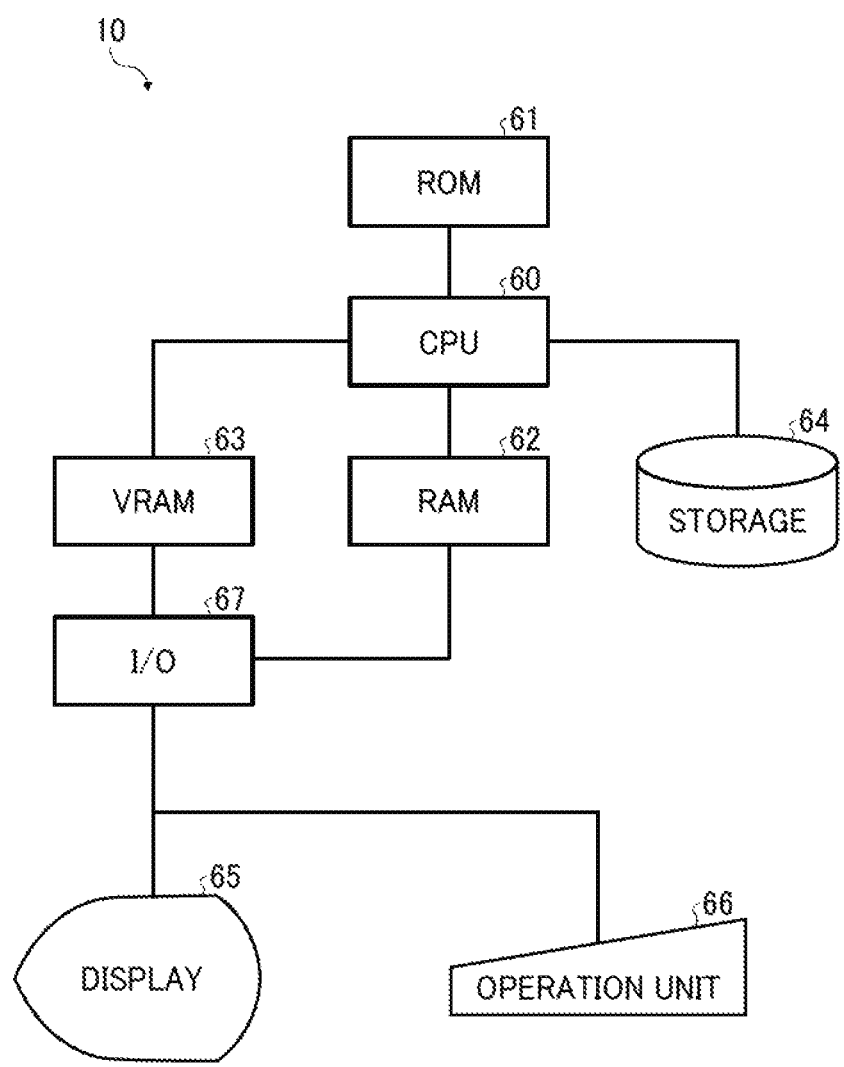
FIG. 5 is a diagram illustrating an exemplary hardware configuration of the information processing apparatus.

Next, a hardware configuration of the information processing apparatus 10 will be described. FIG. 5 is a diagram illustrating an exemplary hardware configuration of the information processing apparatus 10. As illustrated in FIG. 5, the information processing apparatus 10 includes a CPU 60, a ROM 61, a RAM 62, a memory such as a video RAM (VRAM) 63, a storage 64 such as an HDD, a display unit 65 such as a display, an operation unit 66 such as a keyboard or a mouse, and an input and output interface I/O 67, and includes a hardware configuration utilizing a normal computer.

In the present embodiment, the CPU 60 implements the respective functional units of the above-described data receiving unit 14, editing unit 20 (reception unit 22, image processing unit 23 (switching unit 24, reading unit 25, display controller 26, setting management unit 27, and generating/editing unit 28) by reading and executing, on the RAM 62, a program stored in the ROM 61 and the like, thereby).

Incidentally, not limited thereto, at least part of the above-described data receiving unit 14, editing unit 20 (reception unit 22, image processing unit 23 (switching unit 24, reading unit 25, display controller 26, setting management unit 27, and generating/editing unit 28)) may be implemented by, for example, a dedicated hardware circuit (e.g., semiconductor integrated circuit or the like). Additionally, in this example, the above-described operation unit 12 is implemented by the operation unit 66, and the above-described display unit 16 is implemented by the display unit 65. Also, the above-described storage 18 can be implemented by, for example, the storage 64.

Incidentally, the program executed by the above-described CPU 60 may be provided by being recorded in a recording medium readable by the computer, such as a CD-ROM, a flexible disk (FD), a CD-R, and a digital versatile disk (DVD) in a file of an installable format or an executable format.

Furthermore, the program executed by the above-described CPU 60 may also be provided by being stored on a computer coupled to a network such as the Internet, and downloaded via the network. Additionally, a control program executed by the above-described CPU 60 may be provided or distributed via a network such as the Internet.

Figure 6A:
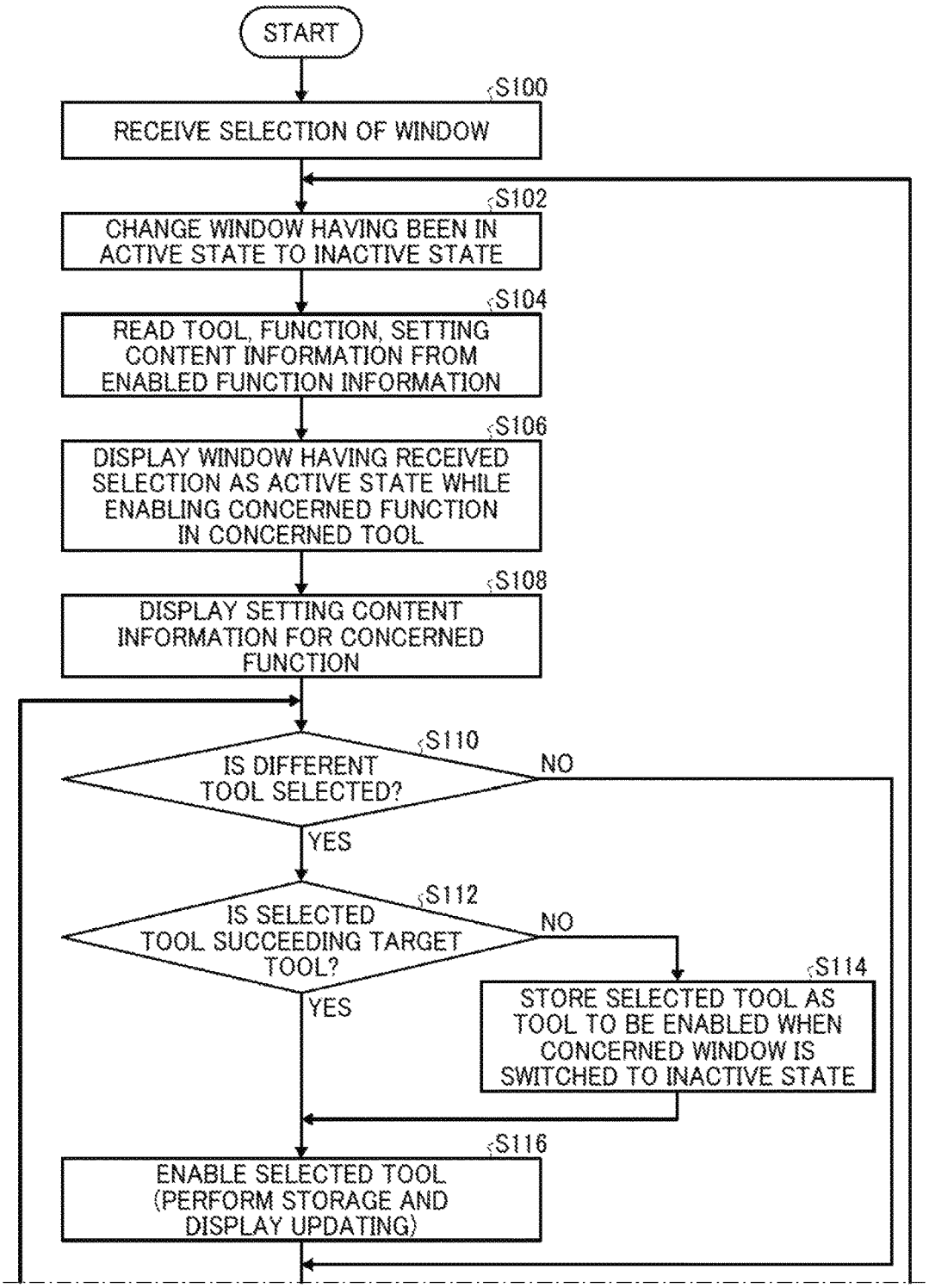
FIGS. 6A and 6B (FIG. 6) are a flowchart illustrating information processing performed by the information processing apparatus according to an embodiment of the present embodiment.
Figure 6B:
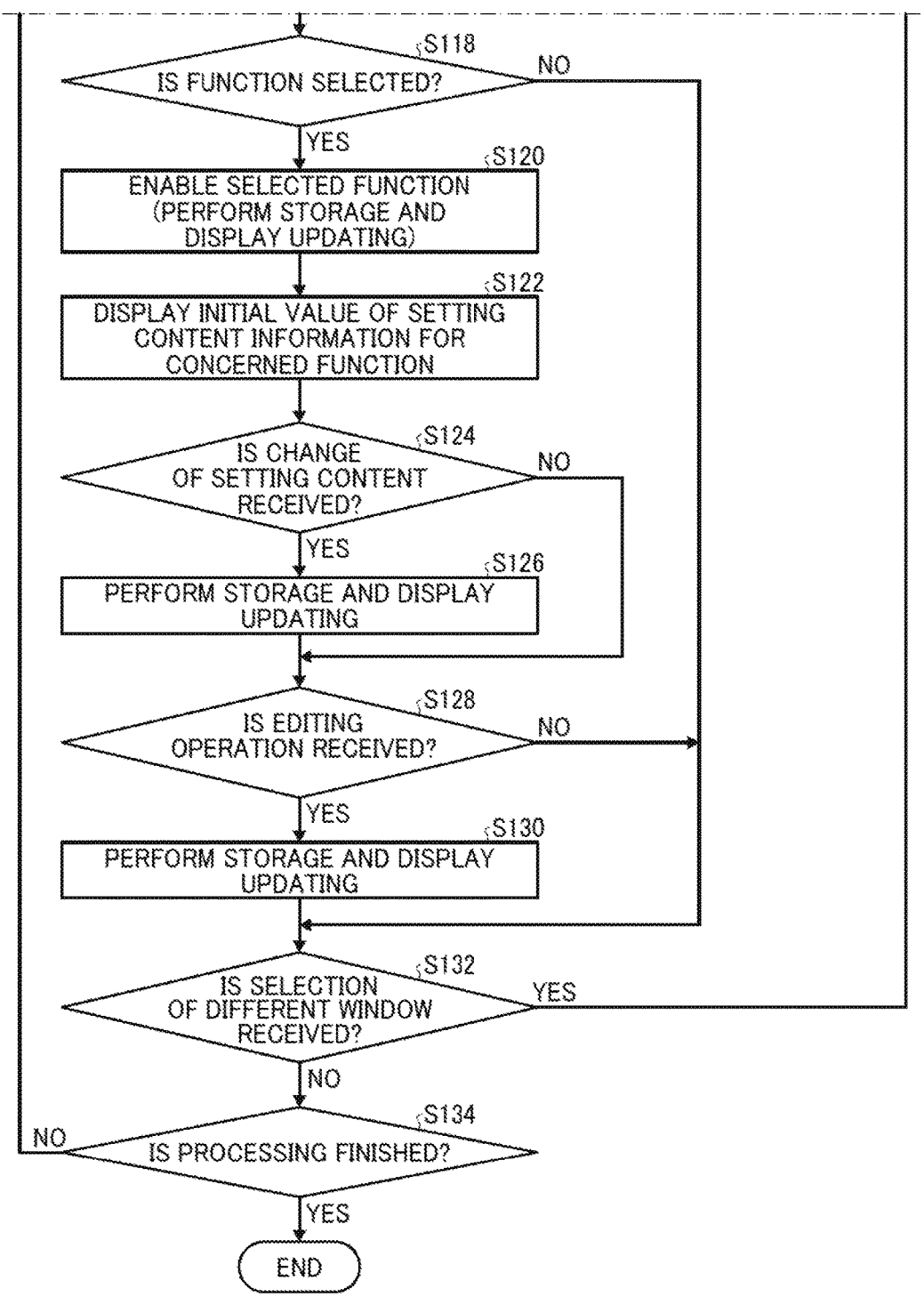

Next, an exemplary procedure executed in the information processing apparatus 10 will be described. FIG. 6 is a flowchart illustrating the exemplary procedure of information processing executed in the information processing apparatus 10 of the present embodiment.

Note that the description will be provided for a case of displaying a plurality of windows 40 on the display unit 16 before processing in step S100. Incidentally, in the case of displaying only one window 40, processing may be performed setting the window 40 in the active state.

First, the reception unit 22 receives selection of one of the plurality of windows 40 currently displayed on the display unit 16 (step S100). Consequently, the reception unit 22 receives a command to switch, to the active state, one of the windows 40 in the inactive state among the plurality of windows 40 currently displayed. Incidentally, there may be a case where a new document is additionally started by a command in accordance with operation at the operation unit 12 by a user while one or more windows 40 are displayed, and a window 40 for the document is displayed. In this case, the reception unit 22 may determine that selection of the window 40 is received when the operation command to display the new window 40 is provided.

Next, in the case of receiving selection of the window 40 in step S100 or in the case of positive determination in step S132 described later (step S132: Yes), the switching unit 24 switches a window 40 that has been in the active state immediately before (till processing in step S100 or step S132) to the inactive state (step S102).

In step S102, the switching unit 24 deletes, from the active-state window ID field of the active state management information 32, a window ID of the window 40 switched to the inactive state and moves the window ID to the inactive-state window ID field (refer to FIG. 4A).

Additionally, the switching unit 24 deletes, from the inactive-state window ID field of the active state management information 32, a window ID of the window 40 having received selection in step S100 or step S118, and moves the window ID to the active-state window ID field (FIG. 4A).

Furthermore, as for the window 40 switched to the inactive state, the switching unit 24 enables a tool stored as a tool to be enabled when the window 40 is switched to the inactive state (refer to step S114 described later). Therefore, the display controller 26 displays, as the inactive state, the window 40 switched to the inactive state on the display unit 16 while enabling a tool different from a tool to provide a function enabled when the window 40 has been in the active state.

Next, the reading unit 25 reads a tool ID, a function ID, and setting content information from the enabled function information 34 (step S104). Consequently, the reading unit 25 reads the tool ID of a tool, the function ID of a function, and the setting content information which are currently selected by the user (in other words, selected immediately before).

Next, the display controller 26 displays, as the active state, the window 40 having received the selection in step S100 or step S132 on the display unit 16 while enabling the function read in step S104 of the tool read in step S104 is enabled (step S106).

For example, the display controller 26 arranges the window 40 having received selection in step S100 or step S132 in the frontmost position among the plurality of windows 40 currently displayed. Then, the display controller 26 sets the window 40 in the state capable of receiving user's operation.

Additionally, the display controller 26 displays, as a selected state, a display field of the window 40 for the function read in step S104 out of a function list. The function list is indicated in a tool bar 42 corresponding to the tool read in step S104. For example, the display controller 26 displays, in the tool bar 42, a color of the display field for the function by using a color different from a color used in display fields of other functions.

Next, the display controller 26 displays setting content information for the function read in step S104 (step S108). For example, the display controller 26 displays a dialogue screen for the function in the window 40 to display the setting content information (setting item and setting value) inside the dialogue screen.

Therefore, in the case where the window 40 is switched, a function enabled immediately before of the tool enabled immediately before in the window 40 that has been in the active state immediately before is displayed in an enabled state also in the window 40 subsequently changed to the active state on the display unit 16. Furthermore, setting content information set for the function enabled immediately before is also enabled in the window 40 subsequently changed to the active state.

Therefore, the user can perform operation input for image editing by operating the window 40 set to the active state by using the operation unit 12 while directly succeeding the function and the setting content information (setting item and setting value) used in the window 40 that has been in the active state immediately before.

Next, the reception unit 22 determines whether selection of a different tool by the user is received via the window 40 in the active state (step S110). In the case of negative determination in step S110 (step S110: No), the processing proceeds to step S118. In the case of positive determination in step S110 (step S110: Yes), the processing proceeds to step S112.

Here, as described above, the information processing apparatus 10 may also allow a function having been enabled in a tool of one window 40 to be succeeded by the same kind of tool in a different window 40 such that the tool is enabled. In this case, in step S112, the switching unit 24 determines whether the different tool selected in step S110 is a target tool (succeeding target tool) having a function succeeded by the same kind of tool (step S12).

In the case of positive determination in step S112 (step S112: Yes), the processing proceeds to step S116.

In the case of negative determination in step S112 (step S112: No), the processing proceeds to step S114. In step S114, the switching unit 24 stores the tool selected in step S110 as a tool to be enabled when a window 40 currently in the active state is switched to the inactive state (step S114). Then, the processing proceeds to step S116.

In step S116, the image processing unit 23 enables the tool selected in step S110 (step S116). In step S116, the setting management unit 27 stores a tool ID of the tool selected in step S110 in the setting management information 35 and the enabled function information 34. Additionally, in step S116, the display controller 26 displays the tool selected in step S110 as an enabled state capable of receiving user's selection in the window 40 in the active state.

Next, the reception unit 22 determines whether selection of a function is received (step S118). In the case of not receiving selection of a function (step S118: No), the processing proceeds to step S132 described later. In the case of receiving selection of a function (step S118: Yes), the processing proceeds to step S120 described later.

In step S120, the display controller 26 updates display of the window 40 such that the function selected in step S118 is displayed in an enabled state (step S120).

Additionally, in step S120, the display controller 26 stores, in the enabled function information 34, a function ID of the function selected in step S118 in a manner correlated to the tool ID of the tool selected in step S110. Incidentally, there may be a case where the function ID of the function selected in step S18 differs from a function ID already stored in the enabled function information 34 at the time of storing the function ID in the enabled function information 34 in step S120. In this case, the display controller 26 may store the function ID of the function selected in step S118 in the enabled function information 34 after deleting setting content information in the enabled function information 34.

Additionally, in step S120, the display controller 26 displays a display field of the function enabled in step S120 as a selected state (for example, by using a color different from a color used for other functions) (step S120).

Then, the display controller 26 displays an initial value of setting content information for the function as setting content information for the function enabled in step S20 (step S122). Therefore, in the case of selecting a tool and a function different from a tool and a function enabled in a window 40 that has been in the active state immediately before, the newly-selected tool and function are enabled in the window 40 currently in the active state, and an initial value of setting content information thereof is displayed.

Next, the reception unit 22 determines whether change of setting content is received for the enabled function (step S124). In the case of negative determination in step S124 (step S124: No), the processing proceeds to step S128. In the case of positive determination in step S124 (step S124: Yes), the reception unit 22 receives setting content information, and the processing proceeds to step S126.

In step S126, the setting management unit 27 registers, in the setting management information 35, the setting content information received in step S124 in a manner correlated to a tool ID of an enabled tool and a function ID of an enabled function (step S126). Incidentally, in the case where setting values corresponding to the same tool ID, function ID, and setting item are already registered in the setting management information 35, the setting management unit 27 may overwrite the setting management information 35 with newly-received setting content information and register the same in a correlated manner.

Therefore, every time the reception unit 22 receives new setting content information in accordance with operation at the operation unit 12 by the user, latest information including a tool and a function enabled by being selected by the user and setting content information corresponding to the selected function are registered in the setting management information 35.

Additionally, the setting management unit 27 registers, in the enabled function information 34, the setting content information received in step S124. Therefore, a tool ID of the tool and a function ID of the function, and the setting content information, which are selected immediately before and latest, are registered in the enabled function information 34.

Next, the reception unit 22 determines whether editing operation using the function is received from the operation unit 12 (step S128). In the case of negative determination in step S128 (step S128: No), the processing proceeds to step S132. In the case of positive determination in step S128 (step S128: Yes), the processing proceeds to step S130. Determining positive in step S128, the reception unit 22 receives operational content at the operation unit 12 by the user. The operational content indicates, for example, an object shape or the like designated by moving a mouse cursor pointing at a current input position of the mouse in a window 40 as the operation unit 12.

In step S130, the image processing unit 23 performs storing and display updating of the window 40 (step S130). In step S130, the generating/editing unit 28 generates or edits an object based on the operational content received in step S128. Specifically, the generating/editing unit 28 performs image editing such as creation/editing of an object by using a function and setting content information currently selected (currently enabled) and operational content operated by using the function. Then, the display controller 26 displays an image of a document including an object subjected to image editing in the drawing area 41 of the window 40 currently in the active state.

Next, the reception unit 22 determines whether selection of a different window 40 other than the window 40 currently in the active state is received (step S132). In the case of positive determination in step S132 (step S132: Yes), the processing proceeds to step S102. On the other hand, in the case of negative determination in step S132 (step S132: No), the processing proceeds to step S134.

In step S134, the editing unit 20 determines whether to finish the processing (step S134). In the case of negative determination in step S134 (step S134: No), the processing returns to step S110 described above. On the other hand, in the case of positive determination in step S134 (step S134: Yes), the present routine ends.

Thus, in the information processing apparatus 10 of the present embodiment, in the case where the user provides an operation command to switch a window 40 to the active state (step S100 and step S132: Yes), a function enabled in the window 40 that has been in the active state immediately before is succeeded as the enabled state also in a window 40 newly set to the active state (step S106 to step S108). Additionally, setting content information set for the function enabled in the window 40 that has been in the active state before the switch to the inactive state is reflected on the window 40 newly set to the active state (step S108).

Therefore, in the information processing apparatus 10 of the present embodiment, work efficiency can be improved at the time of performing image editing while displaying the plurality of windows 40.

Next, a description will be provided for exemplary display transition of windows 40 displayed on the display unit 16 by the above-described processing executed by the information processing apparatus 10. FIGS. 7A to 7C are explanatory diagrams illustrating the exemplary display transition of windows 40 when a user performs operation via the operation unit 12 while a plurality of windows 40 (window 40A, window 40B) is displayed by starting a plurality of applications (Acrobat).

For example, as illustrated in FIG. 7A, assume that the window 40A is in the active state and the window 40B is in the inactive state. Then, assume that a function A in a tool A of the window 40A is selected and enabled in accordance with an operation command at the operation unit 12 by the user. In this case, the function A is displayed in the window 40A in a selected state (refer to an area S). Additionally, a dialogue screen 45 to input setting content information for the function A is enabled in the window 40A.

Next, assume that the window 40B is selected from the state illustrated in FIG. 7A in accordance with an operation command at the operation unit 12 by the user. Then, as illustrated in FIG. 7B, the window 40A becomes the inactive state and the window 40B becomes the active state. In this case, the function A enabled in the window 40A that has been in the active state immediately before is displayed in the selected state in the window 40B. Additionally, a dialogue screen 45 to input setting content information for a function B is enabled in the window 40B. Furthermore, the selected state of the function in the window 40A set to the inactive state is released. For example, a tool that has been selected in the window 40A before selecting the tool A may be displayed in a selected state in the window 40A set to the inactive state.

Next, assume that the dialogue screen 45 of the function A is closed from the state illustrated in FIG. 7B in accordance with an operation command at the operation unit 12 by the user. In this case, as illustrated in FIG. 7C, the dialogue screen 45 is not displayed in the window 40B currently in the active state and the selected state of the function is released. At this point, for example, a tool that has been selected in the window 40B before selecting the tool A may be displayed as a selected state in the window 40B.

Figure 8:
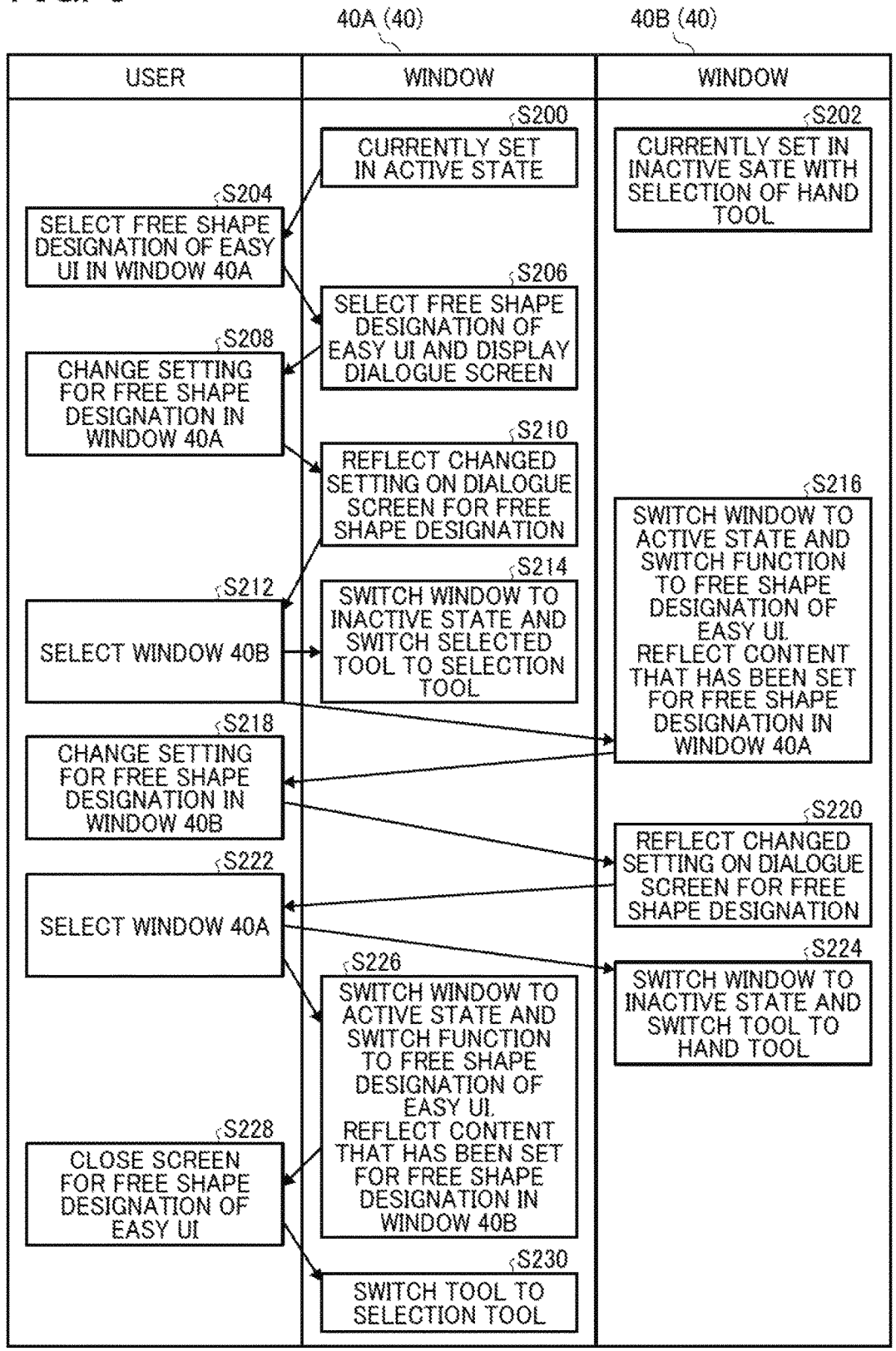
FIG. 8 is an explanatory diagram illustrating exemplary display transition of windows.

Next, a description will be provided for an exemplary flow of operation of windows 40 displayed in the display unit 16 by executing the above-described processing by the information processing apparatus 10. FIG. 8 is an explanatory diagram illustrating the exemplary display transition of windows 40 when a user performs operation via the operation unit 12 while a plurality of windows 40 (window 40A, window 40B) is displayed by starting a plurality of applications (Acrobat). Note that FIG. 8 illustrates a case an enabled function and setting content information are succeeded between the same kind of tools.

For example, assume that a window 40A is in the active state and a window 40B is in the inactive state among a plurality of windows 40 (window 40A and window 40B) (step S200 and step S202). Additionally, assume that a certain tool (for example, "selection tool") is enabled in the window 40A.

Then, assume that a function of "free shape designation" in a tool of "easy UI" in the window 40A is selected in accordance with an operation command at the operation unit 12 by the user (step S204). Consequently, the function of "free shape designation" in the tool of "easy UI" is displayed in a selected state in the window 40A (step S206).

Additionally, assume that setting content information for the function of "free shape designation" is changed by operating the window 40A in accordance with an operation command at the operation unit 12 by the user (step S208). Then, the setting content information set in step S208 is displayed in a screen (such as dialogue screen) to input setting content for the function of "free shape designation (hereinafter may be simply referred to as free shaping)" in the window 40A (step S210).

Furthermore, assume that the window 40B is selected in accordance with an operation command at the operation unit 12 by the user (step S212). Then, the window 40A becomes the inactive state, and a selection state of the function is released (step S214). Furthermore, the tool of "selection tool" different from the tool of "easy UI" that has been enabled in the active state is enabled in the window 40A.

On the other hand, the window 40B becomes the active state (step S216), and then the function of "free shape designation" in the tool of "easy UI" that has been selected in the window 40A is displayed in a selected state in the window 40B, and also setting content information for the function of "free shape designation" set in the window 40A is displayed (step S216).

Additionally, assume that the setting content information for the function of "free shape designation" is changed by operating the window 40B in accordance with an operation command at the operation unit 12 by the user (step S218). Then, the setting content information that has been set in step S218 is displayed in a screen (such as dialogue screen) to input setting content for the function of "free shape designation" in the window 40B (step S220).

Furthermore, assume that the window 40A is selected in accordance with an operation command at the operation unit 12 by the user (step S222). Then, the window 40B becomes the inactive state, and the selected state of the function is released (step S224). At this point, the image processing unit 23 may switch the window 40B to a state in which the tool (e.g., "hand tool") that has been selected in the previous inactive state (step S202) may be enabled.

On the other hand, the window 40A becomes the active state by the processing in step S222. Then, the function of "free shape designation" in the tool of "easy UI" that has been selected in the window 40B immediately before is displayed in the window 40A in a selected state, and also setting content information for the function of "free shape designation" set in the window 40B is displayed (step S226).

Additionally, assume that selection of the function in the tool of "easy UI" is released in the window 40A in the active state in accordance with an operation command at the operation unit 12 by the user (step S228).

Then, a tool in the window 40A is switched to the tool ("selection tool" selected in step S200) that has been selected before the switch to the inactive state (step S230).

Next, the above-described image processing will be described as data exchange among an application (e.g., Acrobat) 20A, a window 40A, a window 40B, and a tool (e.g., "easy UI") 20B. As described above, a functional unit of the editing unit 20 is implemented by executing the application (application 20A) and the tool (easy UI 20B (plug-in)) (refer to FIG. 1).

Figure 9B:
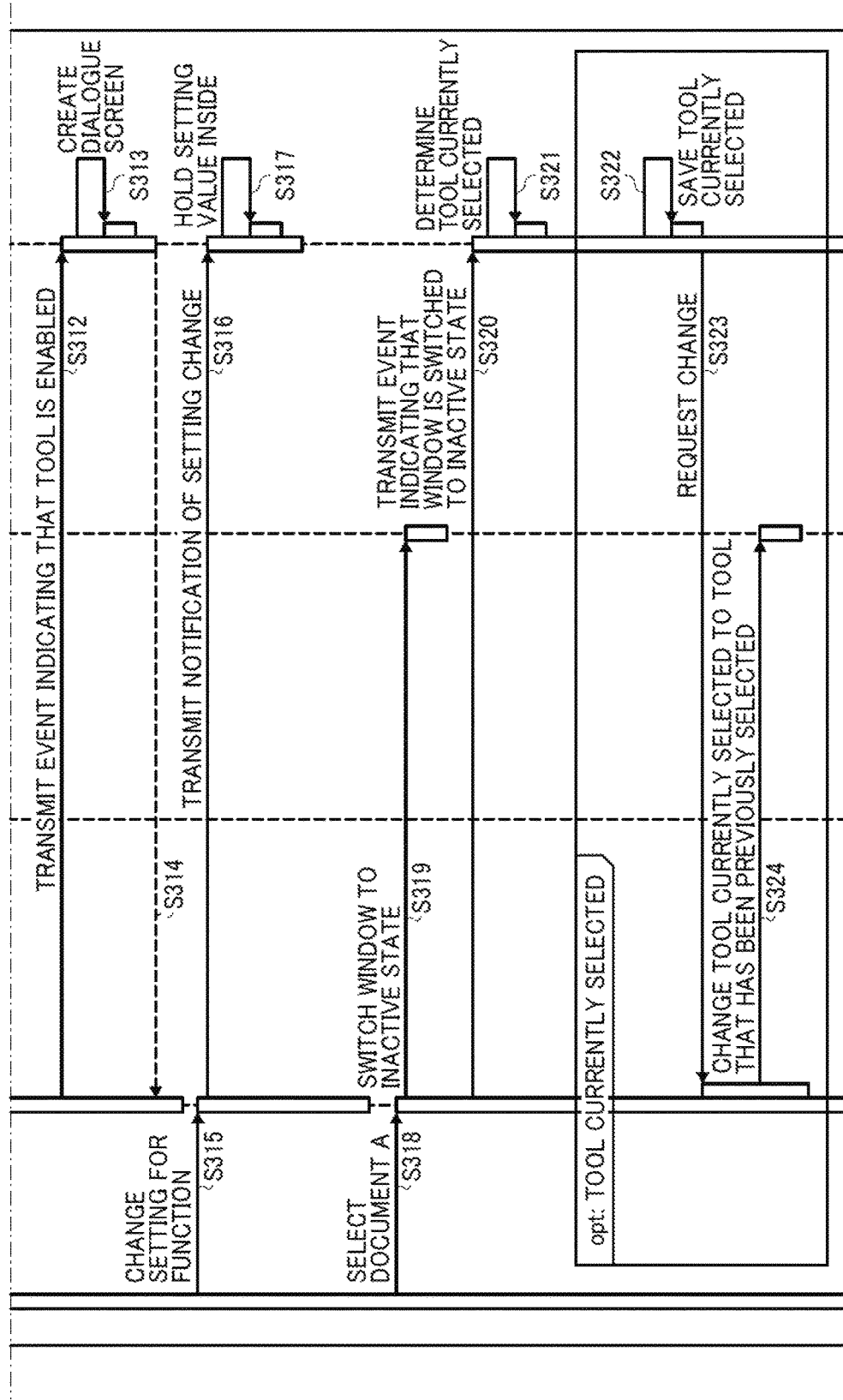
Figure 9C:
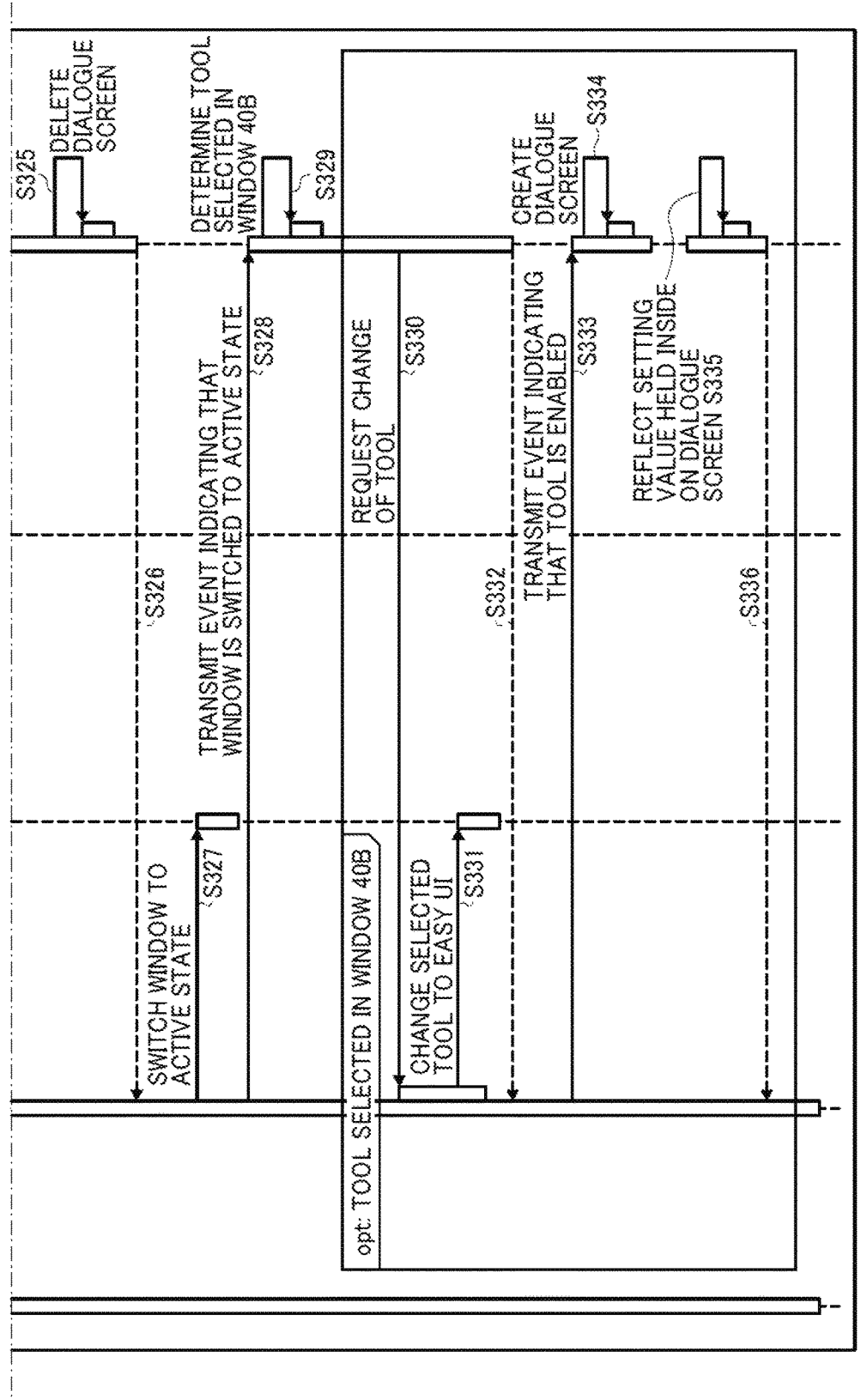

FIG. 9 is a sequence diagram illustrating an exemplary image processing in the case of switching a window 40 after displaying the window 40A and the window 40B on the display unit 16 by consecutively opening each of a document A and a document B by the application (Acrobat) 20A.

For example, a user opens the document A by using the application (Acrobat) 20A by operating the operation unit 12 (step S300). Then, the application 20A displays the window 40A of the document A on the display unit 16 (step S301). Subsequently, the application 20A changes the window 40A of the document A to the active state (step S302).

Next, the user opens the document B by the application 20A by operating the operation unit 12 (step S303). Then, the application 20A changes the window 40A to the inactive state (step S304). Subsequently, the application 20A displays the window 40B of the document B on the display unit 16, and changes the window 40B to the active state (step S305 and step S306).

Next, when a user selects the tool of "easy UI" in the window 40B by operating the operation unit 12 (step S307), the "easy UI 20B" receives event information indicating operation of the tool of "easy UI" from the application 20A (step S308). Then, the easy UI 20B transmits, to the application 20A, a request for change to the tool of "easy UI" (step S309).

The application 20A changes the tool currently selected in the window 40B to the "easy UI" (step S310).

At this point, the easy UI 20B receives, from the application 20A, event information indicating a state that the tool of "easy UI" is selected (step S311 and step S312). Having received the event information, the easy UI 20B creates a dialogue screen to receive input of setting content information for each of functions in the tool of "easy UI" (step S313 and step S314).

When change of setting content for a function in the tool of "easy UI" is received in accordance with an operation command at the operation unit 12 by the user (step S315), the application 20A notifies the easy UI 20B of the setting change (step S316). Specifically, the application 20A notifies the easy UI 20B of a function ID of the function and the setting content information changed in step S315.

The easy UI 20B holds the received function ID and setting content information (setting item and setting value) (step S317). In other words, the easy UI 20B registers the setting content information in setting management information 35 of the storage 18.

Then, the window 40A is selected by selecting the document A in accordance with an operation command at the operation unit 12 by the user (step S318). Having received selection of the window 40A, the application 20A switches the window 40B to the inactive state (step S319). Then, the application 20A transmits, to the easy UI 20B, event information indicating that the window 40B is switched to the inactive state (step S320).

The easy UI 20B determines a tool, a function, and setting content information currently selected (step S321). Then, in the case where the currently selected tool is the "easy UI", the processing proceeds to step S322. In step S322, the easy UI 20B saves, as the currently selected tool, function, and setting content information, the function of the tool and setting content information which are currently selected (step S322). For example, the easy UI 20B stores the setting content information in setting management information 35 and updates enabled function information 34.

Then, the easy UI 20B requests the application 20A to change the tool and the function (step S323). The application 20A changes the tool to be selected in the window 40B to a tool that has been previously selected (namely, a tool that has been selected immediately before becoming the active state) in the window 40B switched to the inactive state (step S324).

Next, the easy UI 20B deletes the dialogue screen that has been created for the window 40B in step S313 to receive input of the setting content information for each of the functions in the tool of "easy UI" (step S325). Then, a deletion notice is transmitted to the application 20A (step S326).

Subsequently, the application 20A switches the window 40A of the document A to the active state (step S327). Then, the application 20A transmits, to the easy UI 20B, event information indicating that the window 40A of the document A is switched to the active state (step S328). The easy UI 20B determines whether the tool that has been selected in the window 40B of the document B is "easy UI" (step S329). Then, in the case of the "easy UI", the processing proceeds to step S330.

In step S330, the easy UI 20B requests the application 20A to change the tool (step S330). The application 20A changes the tool currently selected in the window 40A to the "easy UI" (step S331). Having received the request from the easy UI 20B, the application 20A transmits, to the easy UI 20B, event information indicating a state that the tool of "easy UI" is selected (step S332 and step S333). Having received the event information, the easy UI 20B creates a dialogue screen to receive input of setting content information for each of the functions in the tool of "easy UI" (step S334). Additionally, the easy UI 20B displays, on the dialogue screen, the above-described setting content information held inside in step S317 (step S335 and step S336).

Figure 10A:
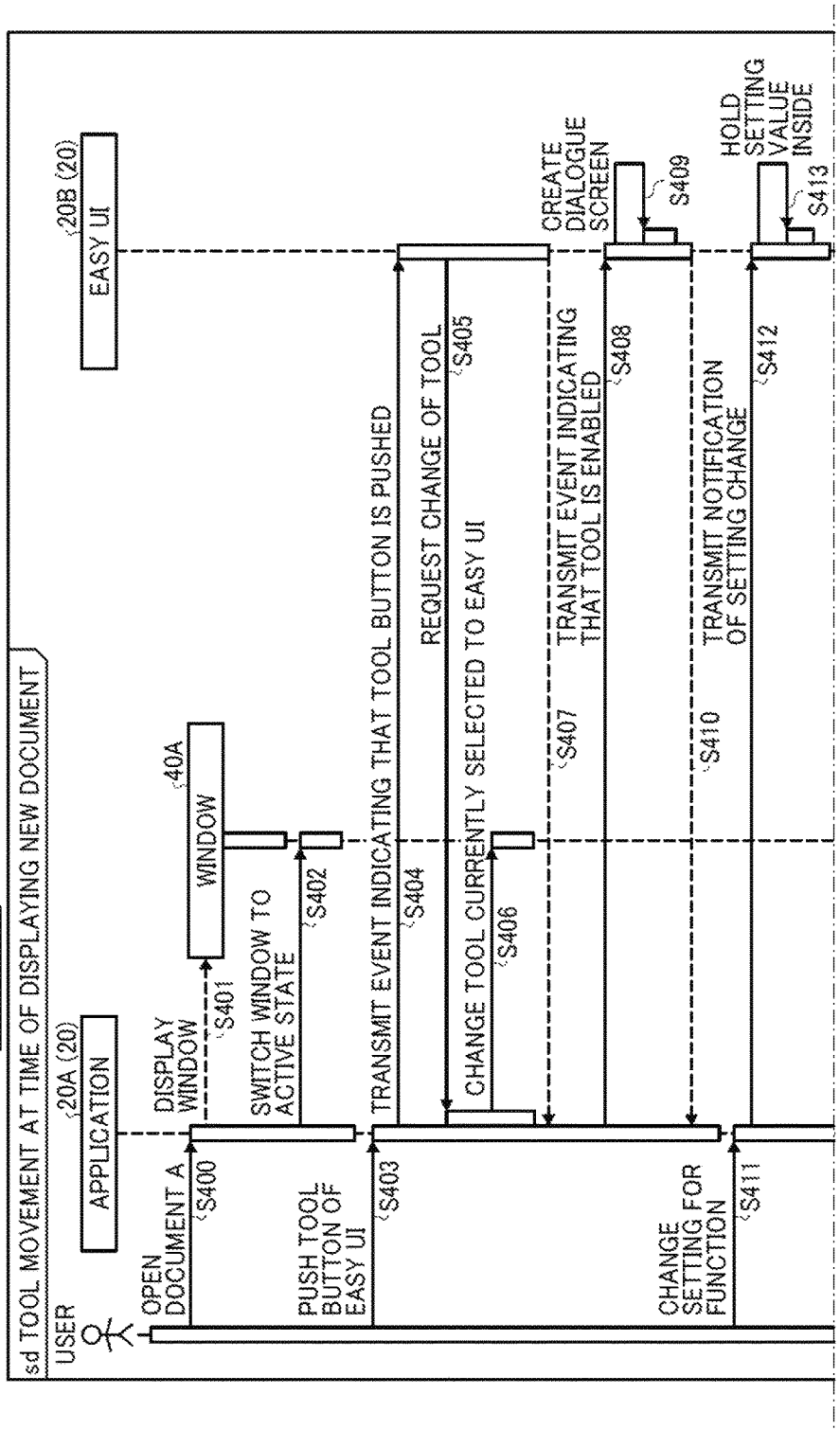
FIGS. 10A to 10C (FIG. 10) are a sequence diagram illustrating an exemplary image processing.
Figure 10B:
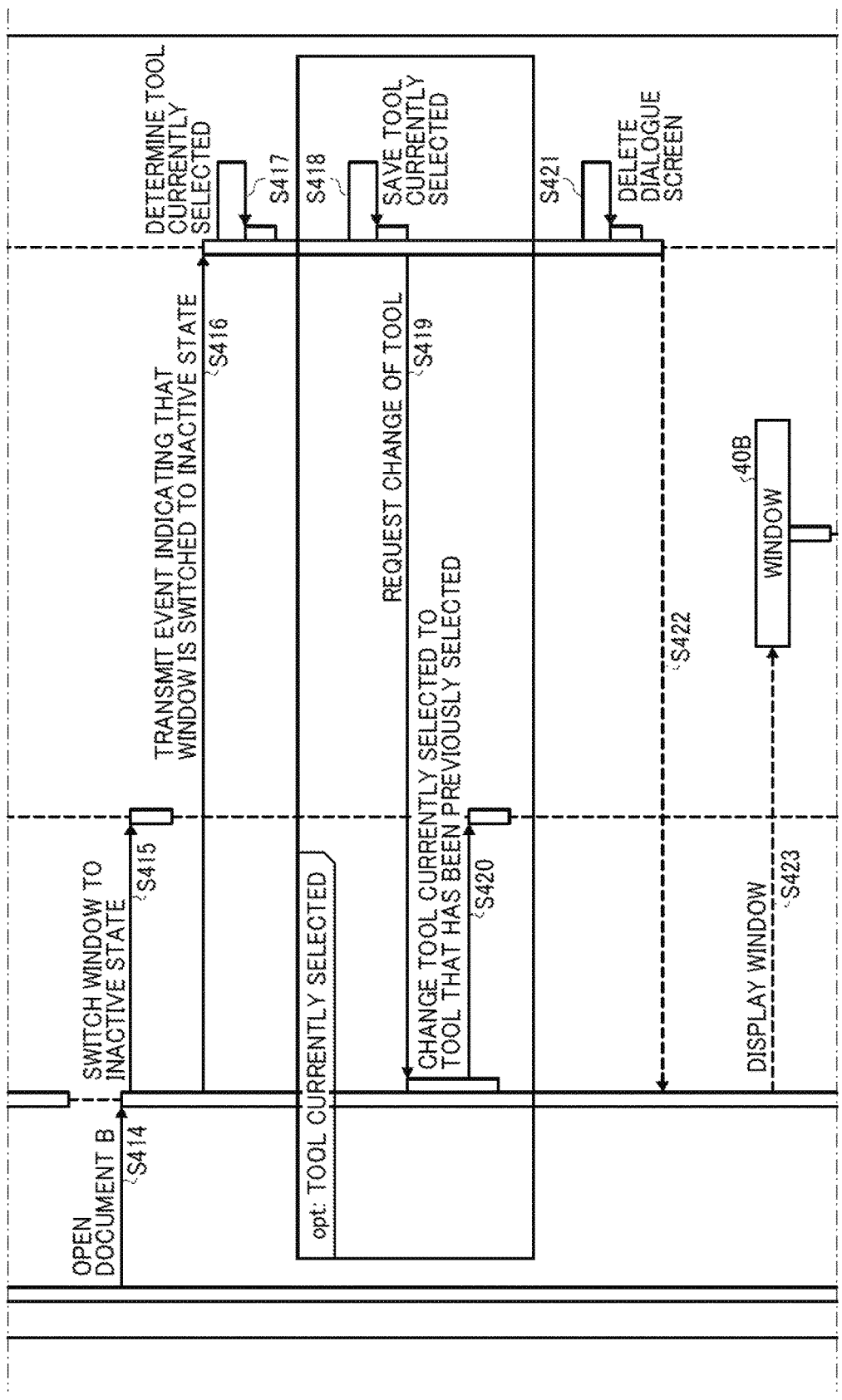
Figure 10C:
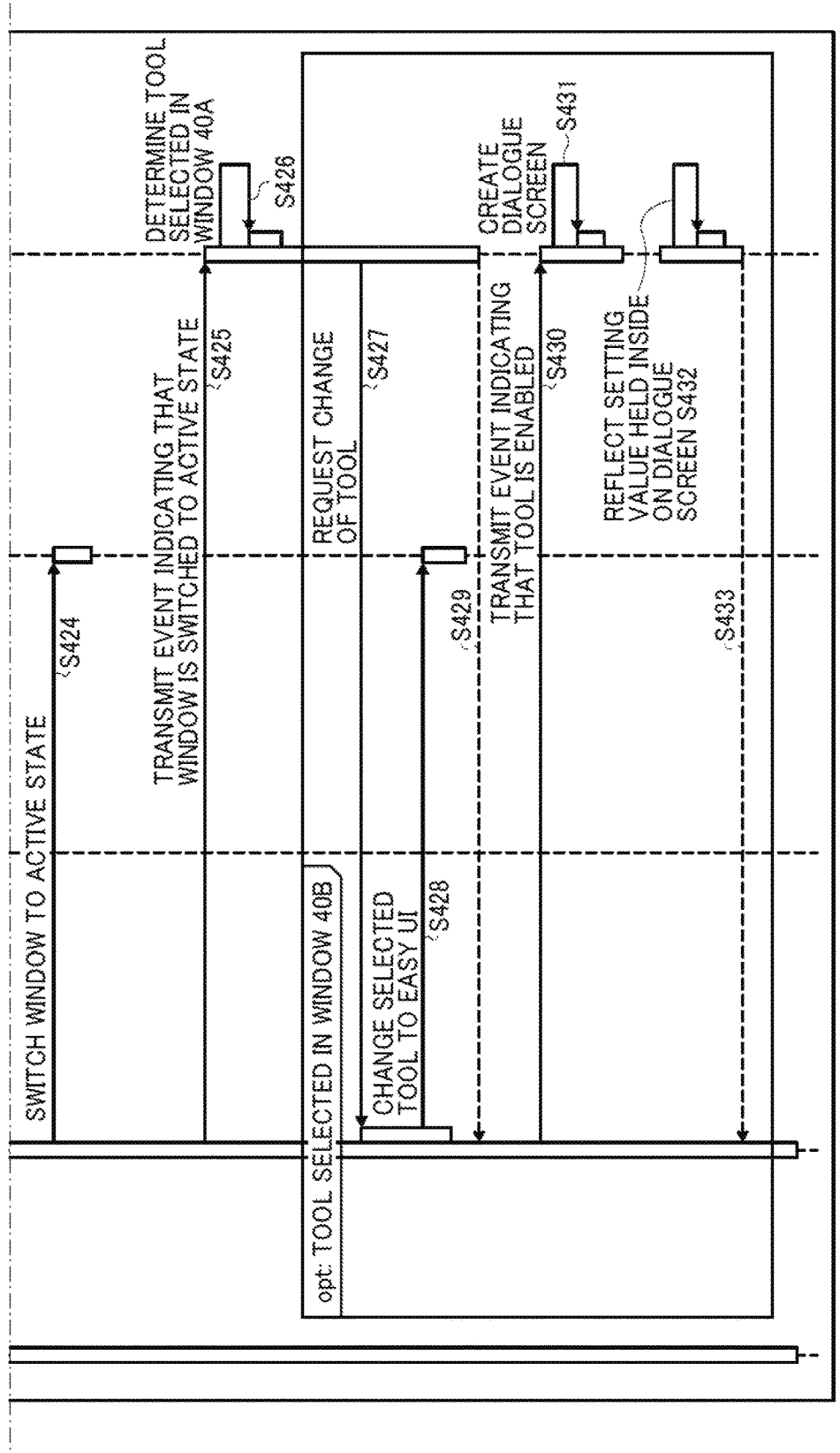

FIG. 10 is a processing sequence diagram illustrating an exemplary image processing in the case of displaying a window 40A by opening a document A by the application 20A and then displaying a window 40B by opening a document B by an application 20A.

For example, a user opens the document A by using the application (Acrobat) 20A by operating the operation unit 12 (step S400). Then, the application 20A displays the window 40A of the document A on the display unit 16 (step S401). Then, the application 20A changes the window 40A of the document A to the active state (step S402).

Next, when the user selects a tool of "easy UI" in the window 40A by operating the operation unit 12 (step S403), the "easy UI 20B" receives event information indicating operation of the tool of "easy UI" from the application 20A (step S404). Then, the easy UI 20B transmits, to the application 20A, a request for change to the tool of "easy UI" (step S405).

The application 20A changes the tool currently selected in the window 40A to the "easy UI" (step S406).

At this point, the easy UI 20B receives, from the application 20A, event information indicating a state that the tool of "easy UI" is selected (step S407 and step S408). Having received the event information, the easy UI 20B creates a dialogue screen to receive input of setting content information for each of functions in the tool of "easy UI" (step S409 and step S410).

When change of setting content for a function in the tool of "easy UI" is received in accordance with an operation command at the operation unit 12 by the user (step S411), the application 20A notifies the easy UI 20B of the setting change (step S412). Specifically, the application 20A notifies the easy UI 20B of a function ID of the function and the setting content information changed in step S411.

The easy UI 20B holds the received function ID and setting content information (setting item and setting value) (step S413). In other words, the easy UI 20B registers the function ID and setting content information in setting management information 35 of the storage 18.

Next, the user opens the document B by the application 20A by operating the operation unit 12 (step S414). Then, the application 20A changes the window 40A to the inactive state (step S415). Then, the application 20A transmits, to the easy UI 20B, event information indicating that the window 40A is switched to the inactive state (step S416).

The easy UI 20B determines a tool and a function currently selected and setting content information (step S417). Then, in the case where the currently selected tool is the "easy UI", the processing proceeds to step S418. In step S418, the easy UI 20B saves, as the currently selected tool, function, setting content information, the tool, function, and setting content information which are currently selected (step S418). For example, the easy UI 20B stores the setting content information in setting management information 35 and updates enabled function information 34.

Then, the easy UI 20B requests the application 20A to change the tool and the function (step S419). The application 20A changes the tool to be selected in the window 40A to a tool that has been previously selected (namely, a tool that has been selected immediately before becoming the active state) in the window 40A switched to the inactive state (step S420).

Next, the easy UI 20B deletes the dialogue screen that has been created for the window 40A in step S409 to receive input of setting content information for each of the functions in the tool of "easy UI" (step S421). Then, a deletion notice is transmitted to the application 20A (step S422).

Subsequently, the application 20A displays the window 40B of the document B on the display unit 16, and switches the window 40B to the active state (step S423 and step S424).

Then, the application 20A transmits, to the easy UI 20B, event information indicating that the window 40B of the document B is switched to the active state (step S425). The easy UI 20B determines whether the tool that has been selected in the window 40A of the document A is "easy UI" (step S426). Then, in the case of the "easy UI", the processing proceeds to step S427.

In step S427, the easy UI 20B requests the application 20A to change the tool (step S427). The application 20A changes the tool currently selected in the window 40B to the "easy UI" (step S428). Having received the request from the easy UI 20B, the application 20A transmits, to the easy UI 20B, event information indicating a state that the tool of "easy UI" is selected (step S429 and step S430). Having received the event information, the easy UI 20B creates a dialogue screen to receive input of setting content information for each function in the tool of "easy UI" (step S431). Additionally, the easy UI 20B displays, on the dialogue screen, the above-described setting content information held inside in step S413 (step S432 and step S433). Then, the present sequence ends.

As described above, the information processing apparatus 10 of the present embodiment includes the reception unit 22, reading unit 25, and display controller 26. The reception unit 22 receives selection of one window 40 to be set to the active state capable of receiving user's operation out of the plurality of windows 40 currently display for a user to perform inputting for an application. The reading unit 25 reads a function related to image editing enabled in a different window 40 that has been in the active state immediately before receiving the selection. The display controller 26 displays, as the active state, the window 40 having received the selection on the display unit 16 while enabling the read function.

Thus, in the case of receiving selection of one window 40 to be set to the active state, the information processing apparatus 10 of the present embodiment displays, as the active state, the window 40 having received the selection. In this window 40, a function enabled in a different window that has been in the active state before receiving the selection is succeeded and enabled.

Therefore, in the information processing apparatus 10 of the present embodiment, a function that has been enabled in one window can be succeeded and used in a different window in the case of displaying a plurality of windows 40 and performing inputting for image editing by using each of the windows. Consequently, every time selecting a desired window 40, a user does not need to repeat selection of a function to be used for image editing all over again, and a function used in a window 40 that has been in the active state immediately before can be directly used in a window 40 set to the active state next.

Therefore, in the information processing apparatus 10 of the present embodiment, work efficiency can be improved at the time of performing image editing while displaying the plurality of windows 40.

Furthermore, the reading unit 25 reads a function and a tool ID of a tool to provide the function enabled in a different window 40 that has been in the active state immediately before receiving the selection. The display controller 26 displays, as the active state, the window 40 having received the selection on the display unit 16 while enabling the read function in the tool identified by the read tool ID.

Furthermore, the reading unit 25 reads a function and setting content information for the function enabled in a different window 40 that has been in the active state immediately before receiving the selection. The display controller 26 displays, as the active state, the window 40 having received the selection on the display unit 16. In the window 40, the read function is enabled and the setting content information is set for the function.

At the time of receiving the selection, the switching unit 24 switches, to the inactive state not capable of receiving user's operation, a different window 40 that has been in the active state immediately before receiving the selection.

The display controller 26 displays, as the inactive state, the window 40 switched to the inactive state on the display unit 16 while enabling a tool different from a tool to provide a function enabled when the window 40 has been in the active state.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising:
   circuitry configured to:
   display, on a display, a plurality of windows for a user to perform inputting for an application;
   receive selection of a first window to be set from an inactive state to an active state, out of the plurality of displayed windows, the window in the active state being capable of receiving user's operation through an input device and to apply the operation to a document displayed in the window, and the selected window, prior to being in the active state, being in the inactive state in which the window is not capable of receiving user's operation;
   retrieve enabled function information corresponding to a function enabled in a second window amongst the plurality of displayed windows different than the first window, said second window having been in an active state immediately before receiving selection of the first window; and
   change the first window to an active state and change a function of the first window to the function enabled in the second window.

2. The information processing apparatus according to claim 1, wherein
   the circuitry is configured to further retrieve tool identifying information of a tool to provide the function corresponding to the enabled function information, and
   the function enabled in the first window is a function in the tool identified by the tool identifying information.

3. The information processing apparatus according to claim 1, wherein
   the circuitry is configured to extract setting content information for the function from the enabled function information, and
   the setting content information is set for the function enabled for the first window.

4. The information processing apparatus according to claim 1, wherein the circuitry is further configured to switch the second window that has been in the active state to the inactive state, in response to receiving selection of the first window.

5. The information processing apparatus according to claim 4, wherein the circuitry is configured to display the second window in the inactive state while enabling a different tool different than the tool providing the function that has been enabled when the second window is in the active state.

6. The information processing apparatus of claim 1, further comprising:
   the display to display the plurality of windows.

7. The information processing apparatus according to claim 1, wherein the circuitry is configured to transmit an event indicating that the second window is being switched to the inactive state, in response to receiving selection of the first window.

8. An information processing method comprising:
- displaying, on a display, a plurality of windows for a user to perform inputting for an application;
- receiving selection of a first window to be set from an inactive state to an active state, out of the plurality of displayed windows, the window in the active state being capable of receiving user's operation through an input device and to apply the operation to a document displayed in the window, and the selected window, prior to being in the active state, being in the inactive state in which the window is not capable of receiving user's operation;
- retrieving enabled function information corresponding to a function enabled in a second window amongst the plurality of displayed windows different than the first window, said second window having been in an active state immediately before receiving selection of the first window; and
- changing the first window to an active state and changing a function of the first window to the function enabled in the second window.

9. A non-transitory recording medium which, when executed by one or more processors, cause the processors to perform an information processing method comprising:
- displaying, on a display, a plurality of windows for a user to perform inputting for an application;
- receiving selection of a first window to be set from an inactive state to an active state, out of the plurality of displayed windows, the window in the active state being capable of receiving user's operation through an input device and to apply the operation to a document displayed in the window, and the selected window, prior to being in the active state, being in the inactive state in which the window is not capable of receiving user's operation;
- retrieving enabled function information corresponding to a function enabled in a second window amongst the plurality of displayed windows different than the first window, said second window having been in an active state immediately before receiving selection of the first window; and
- changing the first window to an active state and changing a function of the first window to the function enabled in the second window.

* * * * *